United States Patent [19]

Nakazawa et al.

[11] Patent Number: 5,023,461

[45] Date of Patent: Jun. 11, 1991

[54] RADIATION IMAGE STORAGE PANEL HAVING LOW REFRACTIVE INDEX LAYER AND PROTECTIVE LAYER

[75] Inventors: Masayuki Nakazawa; Masaaki Nitta; Hisanori Tsuchino; Akiko Kano, all of Hino, Japan

[73] Assignee: Konica Corporation, Tokyo, Japan

[21] Appl. No.: 366,785

[22] Filed: Jun. 15, 1989

Related U.S. Application Data

[63] Continuation-in-part of Ser. No. 232,495, Aug. 15, 1988, abandoned.

[30] Foreign Application Priority Data

| | | | |
|---|---|---|---|
| Aug. 18, 1987 | [JP] | Japan | 62-206017 |
| Aug. 24, 1987 | [JP] | Japan | 62-211066 |
| Jun. 10, 1988 | [JP] | Japan | 63-141522 |
| Jun. 21, 1988 | [JP] | Japan | 63-151123 |

[51] Int. Cl.[5] ........................ G01N 23/04; G03C 5/17

[52] U.S. Cl. ................................ 250/484.1; 250/487.1

[58] Field of Search ...................... 250/484.1 B, 487.1, 250/327.2 C; 428/690; 427/64, 65

[56] References Cited

U.S. PATENT DOCUMENTS

| | | | |
|---|---|---|---|
| 4,205,116 | 5/1980 | Van Landeghem | 427/65 |
| 4,212,107 | 9/1981 | Tanaka et al. | 427/64 |
| 4,491,732 | 1/1985 | Pritzkow et al. | 250/366 |
| 4,637,898 | 1/1987 | DeBoer et al. | 250/301.36 |
| 4,733,090 | 5/1988 | DeBoer et al. | 250/487.1 |

*Primary Examiner*—Jack I. Berman
*Assistant Examiner*—Richard Hanig
*Attorney, Agent, or Firm*—Frishauf, Holtz, Goodman & Woodward

[57] ABSTRACT

There are disclosed a radiation image storage panel having a stimulable layer and a protective layer on a support, which comprises a layer having a lower refractive index than the protective layer is provided between the stimulable phosphor layer and the protective layer; and a process for preparing a radiation image storage panel composed of a support, a stimulable phosphor layer and a protective layer, and a protective layer supporting member is so provided between layers of the support and the protective layer as to surround and seal edges of the stimulable phosphor layer, which comprises the steps of providing at least one notch to the protective layer supporting member which functions as a vent hole, heating and drying the radiation image storage panel, and then fusing and sealing the notch or notches.

71 Claims, 9 Drawing Sheets

RADIATION IMAGE STORAGE PANEL HAVING LOW REFRACTIVE INDEX LAYER AND PROTECTIVE LAYER

This application is a continuation-in-part application of our application Ser. No. 232,495 filed Aug. 15, 1988 now abandoned.

BACKGROUND OF THE INVENTION

This invention relates to a radiation image storage panel having a stimulable phosphor layer. More particularly, it relates to a radiation image storage panel which is protected from deterioration due to the penetration of water, which endures for a long period of use, and which is high in sharpness.

Radiation images like X-ray images are often used in diagnosis of diseases.

In order to obtain the X-ray images, X-ray image converting methods of directly taking out images from phosphors have been devised in place of light-sensitive silver halide materials.

The methods include a method in which the radiation (generally X-ray) transmitted through a subject is absorbed to a phosphor, and thereafter this phosphor is excited by light or heat energy to bring the radiation energy stored by above absorption to radiate as fluorescence, which fluorescence is detected and formed into an image.

Specifically, U.S. Pat. No. 3,859,527 and Japanese Provisional Patent Publication No. 12144/1980 disclose radiation image storage methods in which a stimulable phosphor is used and visible light or infrared rays are used as stimulating light.

This method employs a radiation image storage panel (hereinafter often referred to as "storage panel") comprising a support formed thereon with a stimulable phosphor layer (hereinafter often referred to simply as "stimulable layer"), wherein radiation transmitted through a subject is applied to the stimulable layer to store radiation energy corresponding to the radiation transmission degree of all areas of the subject to form an image, and thereafter this stimulable layer is scanned with the stimulating light to bring the radiation energy stored in the areas to radiate to convert this into light, thus obtaining an image according to signals based on the strength of this light.

This image finally obtained may be reproduced as a hard copy, or may be reproduced on a CRT.

The storage panel to be used in this radiation image storage method irradiates stored energy by scanning of the stimulating light after stored radiation image information so that stored radiation images can be again carried out after scanning, the storage panel can thus be used repeatedly.

The above storage panel shall desirably endure for a long time or many times of repeated use without deteriorating image quality of the obtained radiation images. In order to satisfy the requirement, it is requested that the stimulable layer of the above storage panel should be sufficiently protected from outer physical or chemical excitation.

In the conventional storage panels, there have been employed the method in which a protective layer to cover a surface of the stimulable layer on a support of the storage panel in order to solve the above problems. This protective layer is, as disclosed in, for example, Japanese Provisional Patent Publication No.

42500/1984, formed by directly coating a coating solution for the protective layer on a stimulable layer or formed by the method in which a previously formed protective layer which had been prepared separately is adhered on a stimulable layer.

As the protective layer, a thin protective layer comprising an organic polymer has generally been used. The reason why such a thin protective layer has been used is to prevent lowering of sharpness of a storage panel as hard as possible.

A relationship between sharpness and a thickness of a protective layer of a storage panel having a stimulable layer is shown in Table 1 by using MTF (Modulation Transfer Function) of a spatial frequency of 1 lp/mm and 2 lp/mm. In Table 1, PET is a polyethylene terephthalate film.

TABLE 1

| Protective layer | Thickness (μm) | 1 lp/mm (%) | 2 lp/mm (%) |
|---|---|---|---|
| None | — | 78 | 41 |
| PET | 8.5 | 74 | 39 |
| PET | 11 | 64 | 35 |
| PET | 25 | 59 | 29 |
| PET | 70 | 54 | 26 |
| PET | 175 | 48 | 24 |
| Glass | 550 | 43 | 20 |

As shown in Table 1, when the protective layer is thicker, sharpness becomes low. A reason that may be mentioned is that reflected scattering light of incident stimulating light at a surface of a stimulable layer is reflected at an interface between the protective layer and air and is then re-incident on the stimulable layer. When the protective layer is thicker, the reflected scattering light extends further and the result is image information of images other than the images to be detected so that sharpness thereof is lowered.

In a conventional film/screen system to be used for X-ray photographing, since the MTF in the case of 1 lp/mm is about 65% and in the case of 2 lp/mm is about 35%, it is not preferred, in a storage panel, to inferior to the values of the above film/screen system. Accordingly, in the protective layer of the conventional storage panel an organic polymer film having a thickness of about 10 μm or so is used.

However, this basic problem of decreasing in sharpness due to providing a protective layer has not yet bear solved. It has been strongly desired to make a storage panel with higher and higher sharpness.

Also, the thin protective layer comprising an organic polymer which is conventionally used is transmissive to some extent of water and/or moisture. Thus, the stimulable layer absorbs water so that the storage panel's sensitivity to radiation is lowered. Further, deterioration of stored energy between after irradiation of radiation and before accepting irradiation of stimulating light fading is large, and thus fluctuation and/or deterioration of image qualities of the obtained radiation images is/are caused.

For example, moisture permeability coefficient of PET having a thickness of 10 μm is about 60 $g/m^2.24$ hr and thus at most 60 g of moisture per unit area transmits therethrough in a day. Even in an oriented polypropylene (hereinafter abbreviated to "OPP"), the moisture permeability coefficient level is about 15 $g/m^2.24$ hr.

Further, in the conventional storage panel having the above-mentioned thin protective layer, since surface hardness of the protective layer is low, flaws on the surface of the protective layer due to contact with a machine component such as a conveying roller, etc. at transmission. Or, flaws will likely be developed due to a crack or a fold in the stimulating layer since impact resistance is insufficient in a thin protective layer. Therefore, there is a problem that image qualities of the obtained radiation image become worse with repeated use.

On the other hand, when the protective layer is thick, the defects caused by a thin film can be overcome but again sharpness becomes low as mentioned above. It has been desired, over two contrary phenomenon, to improve from the aspects of moisture resistance, strength and impact resistance without impairing sharpness.

One such attempted storage panel can be prepared by sealing at edge portions of a laminating product comprising a support, a stimulable phosphor and a protective layer in order to improve humidity resistance. As the method of sealing, there have been employed, for example, the method in which edge portions are sealed with a sealing agent and the sealing agent is solidified by a solidifying agent from outside (Japanese provisional Patent Publication No. 237099/1986) or the method in which edge portions are sealed at the state of being coated with elongated portions of the protective layer (Japanese provisional Patent Publication No. 237100/1986).

However, by sealing them only by the above methods, the effect of water to permeating a protective layer to a stimulable layer cannot sufficiently be prevented.

As described above, in a storage panel which employs the conventional stimulable phosphor, there is the disadvantage that sharpness becomes necessarily low by providing a protective layer.

Also, in the conventional storage panel, when a thin protective layer is employed in order to prevent lowering in sharpness of images, there are problems that fluctuation or deterioration of obtained radiation images are caused by chemical stimulations from outside, particularly by permeation of water or moisture, or breakage of the stimulable layer, etc. is caused by physical stimulations from outside. On the other hand, for the purpose of protecting from such chemical and physical stimulations, when a thick protective layer is used, there is a problem that sharpness of images becomes low.

Further, when preparing the conventional storage panel, adhesion between a protective layer and a stimulable layer and/or the stimulable layer and a support may be sometimes carried out by using an adhesive agent. There is the problem in that heat added to heat and cure the adhesive agent, causes the storage panel to deform or warp, and as a result, damages are caused in the stimulable layer whereby the quality of images becomes low.

Moreover, even when a protective layer is provided on a stimulable layer and edges of a storage panel are sealed, a stimulable phosphor absorbs moisture during preparation of a storage panel so that the initial characteristics of the storage panel becomes low. Furthermore, the fluctuation of characteristics of each storage panel is a problem since the extent of the above moisture absorption depends largely on atmosphere at the preparation step. Thus, when heating and drying are carried out after sealing edges of the storage panel, there is the problem that air at the inside of the storage panel expands whereby it becomes a cause of destruction or deformation of the storage panel, and therefore it is not preferred.

SUMMARY OF THE INVENTION

Thus, an object of the present invention is to provide a storage panel having high durability and long lifetime, which can prevent a stimulable layer from outer physical excitation and chemical stimulation, one which can particularly protect sufficiently against water, without impairing sharpness of images, one which can maintain high sensitivity, high sharpness and high graininess of the stimulable layer for a long time and one which can use with good conditions.

Further, an object of the present invention is to provide a storage panel which can also solve the problems that a support or a protective layer cause by deformation by heat which is added at preparation of the storage panel or by temperature change at use. Thus, damage is caused in the stimulable layer whereby quality of images becomes low.

A radiation image storage panel of the present invention comprises a radiation image storage panel having a stimulable phosphor layer and a protective layer on a support, a layer having a lower refractive index than the protective layer being provided between said stimulable phosphor layer and said protective layer.

Also, the above radiation image storage panel of the present invention comprises a radiation image storage panel having a stimulable phosphor layer and a protective layer on a support, a first layer having a lower refractive index than the protective layer being provided between said stimulable phosphor layer and said protective layer, and a second layer having a higher refractive index than the first layer being provided between said first layer and said stimulable phosphor layer.

Further, a radiation image storage panel of the present invention comprises a radiation image storage panel in which a stimulable phosphor layer and at least one protective layer are provided on a support successively, a layer having a lower refractive index than the protective layer, composed of a protective layer supporting member with a thickness the same with or thicker than that of said stimulable phosphor layer, being provided between said stimulable phosphor layer and said protective layer so as to seal edges of said stimulable phosphor layer.

Moreover, a radiation image storage panel of the present invention comprises a radiation image storage panel in which a stimulable phosphor layer and at least one protective layer are provided on a support successively, a first moistureproof member with a thickness the same with or thicker than that of said stimulable phosphor layer being provided between said support and said protective layer so as to seal the edges of said stimulable phosphor layer, and void portion formed by said first moistureproof member, said support and said protective layer being filled with a second moistureproof member.

Furthermore, a radiation image storage panel of the present invention comprises a radiation image storage panel having a stimulable phosphor layer and a protective layer on a support, a layer having a lower refractive index than the protective layer being provided between said stimulable phosphor layer and said protective layer and said protective layer being at least two layers having different moisture-absorption characteristics with each other.

Further, a radiation image storage panel of the present invention comprises a radiation image storage panel having a stimulable phosphor layer and a protective layer on a support, a first layer having lower refractive index than the protective layer being provided between said stimulable phosphor layer and said protective layer, a second layer having higher refractive index than that of the first layer being provided between said first layer and said stimulable phosphor layer, and said second layer being high in moisture-absorption characteristics.

Further, the present invention aims to provide a process for preparing a radiation image storage panel which comprises, in a process for preparing a radiation image storage panel comprising a support, a stimulable phosphor layer and a protective layer, and a protective layer supporting member (a spacer) being provided between layers of said support and said protective layer so as to surround and seal edges of said stimulable phosphor layer, providing notches to said protective layer supporting member (a spacer) which functions as a vent hole, heating and drying said radiation image storage panel, and then fusing and sealing said notches.

DESCRIPTION OF THE PREFERRED EMBODIMENTS

Figure 1:
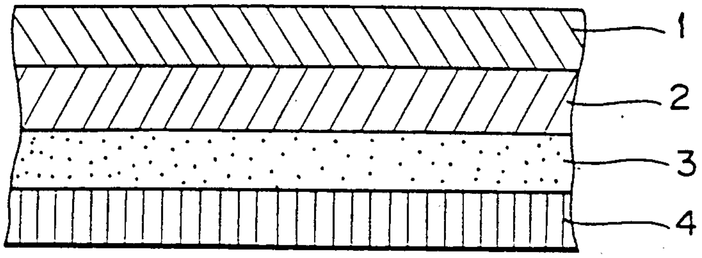
FIG. 1 is a sectional view showing a basic constitution of the present invention.

In the following, the present invention will be explained in detail by referring to the drawings.

FIG. 1 is a sectional view showing a part of one example of the storage panel according to the present invention and 1 is a protective layer, 2 is a layer with a lower refractive index, 3 is a stimulable layer, and 4 is a support.

In the following, respective constituents will be explained in more detail.

In the storage panel of the present invention, as a material which can form a protective layer, those which are excellent in light-transmission and which may be formed into sheets may be mentioned. Further, for the protective layer, it is preferred to use those which show a high light-transmittance in a wide range of wavelengths in order to transmit stimulating light or emitted light with good efficiency, more preferably those having light-transmittance of 80% or more.

Examples of those may include sheet glasses such as quartz glass, borosilicate glass, chemically reinforced glass, etc., organic polymer compounds such as PET, OPP, polyvinyl chloride, etc. Here, the borosilicate glass shows the light-transmittance of 80% or higher in the wavelengths range of 330 nm to 2.6 μm, and in the quartz glass, high light-transmittance can be obtained even in shorter wavelengths than the above.

The protective layer may be a single layer or multilayer, or may be formed by two or more layers different in materials. For example, a composite film comprising two or more layers of organic polyer membrane may be employed. As the method for preparing such a composite polymer film, there may be mentioned the methods of dry laminate, extrusion laminate or co-extrusion coating laminate. As a combination of two or more protective layers, it is not limited to combination of organic polymers themselves, but may be mentioned sheet glasses themselves, or a sheet glass and an organic polymer layer, etc. For example, as the method for combining the sheet glass and the polymer layer, there may be mentioned the method in which a coating solution for the protective layer is directly coated on the sheet glass to form thereon or the method in which a polymer protective layer which had been previously prepared is adhered onto the sheet glass. Two or more of the protective layers may be adhered or separated from each other.

In the protective layer of the storage panel according to the present invention, by employing at least two layers having different moisture-absorption characteristics, further improvement in moisture resistance can be realized.

Here, the expression of "different in moisture-absorption characteristics" means that if the protective layer comprises two layers of A and B, an equilibrium moisture--absorption isothermic curve of the layer A at a temperature at which the above storage panel is exposed by the usual use conditions disagrees with that of the layer B at said temperature.

Figure 2A:
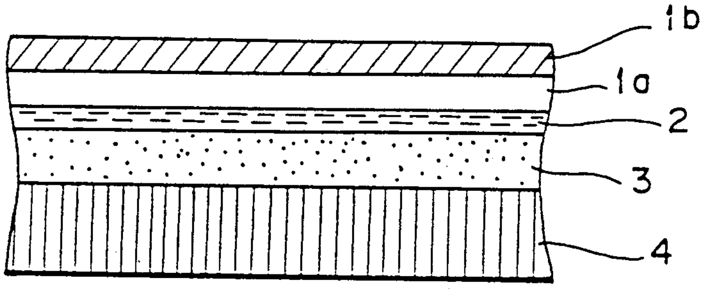
FIGS. 2 to 6, 8 to 13, 15 to 18, 20, 22 and 23 are sectional views showing exemplary constitutions of the present invention.

In FIG. 2A, a constitution example of the storage panel having two layers of the protective layers is shown as a sectional view. In the figure, 1*a* and 1*b* are protective layers, and 1*a* in contact with a stimulable layer is a protective layer having a relatively larger moisture-absorption characteristic and the outermost layer of 1*b* is a protective layer having a smaller moisture-absorption characteristic. Also, as in FIG. 1, 2 is a lower refractive index layer, 3 is a stimulable layer and 4 is a support. By constituting the protective layer as in FIG. 2A, humidity resistance of the storage panel can greatly be improved and therefore it is particularly preferred. That is, water or water vapor present outside of the storage panel is prevented from permeating inside the storage panel by the protective layer 1*b*. However, when an organic polymer is used as the protective layer 1*b*, it is impossible to perfectly shut out water and some extent of water always permeates therethrough. The amount of water transmittance generally increases in proportion to difference in humidity between the outer field and the inside of the protective layer 1*b*. Water permeated through the protective layer 1*b* reaches the surface of a protective layer 1*a*, but the protective layer 1*a* has large moisture-absorption characteristics so that it retains the above water at the surface of the side adjacent to the layer 1*b* and inside of the layer whereby it functions to prevent arrival of water to the stimulable layer. As a result, deterioration due to absorption of water of the above stimulable layer decreases as compared with the conventional storage panel.

Further, a composite protective layer having the layer constitution shown in FIG. 2A can be made a composite protective layer having properties that moisture permeability of the direction from 1*b* to 1*a* is extremely small and that of the direction from 1*a* to 1*b* is relatively large by selecting suitable materials for protective layers. Generally speaking, a membrane having small moisture-absorption characteristics has the property that its moisture permeability coefficient is small in humidity dependence, and a membrane having large moisture-absorption characteristics has the property that its moisture permeability coefficient is large in temperature dependence. Accordingly, since the moisture-absorption characteristics of the protective layer 1*b* little depend on humidity, and since the moisture-absorption characteristics of the protective layer 1*a* largely depend on temperature, a composite system of both shows two sides of moisture permeability in the well known composite membrane. That is, the moisture permeability where 1*b* is provided so as to contact with a high humidity side becomes smaller than that of the case where 1*a* is provided at the high humidity side. If the difference between both of the moisture permeabilities is enlarged by a suitable combination of materials for the protective layers, a storage panel which is excellent in humidity resistance and, when a stimulable layer absorbs water, rapidly releases water by exposing it to fresh air of low humidity can be prepared.

Also, when a sheet glass is employed as the protective layer 1*b*, it is possible to substantially completely shut out water from the surface of the panel. However, water may sometimes permeate into side edges of the protective layer and the support. At that time, the protective layer 1*a* having high moisture-absorption characteristics absorbs water and prevents arrival of water to the stimulable layer.

Figure 2B:
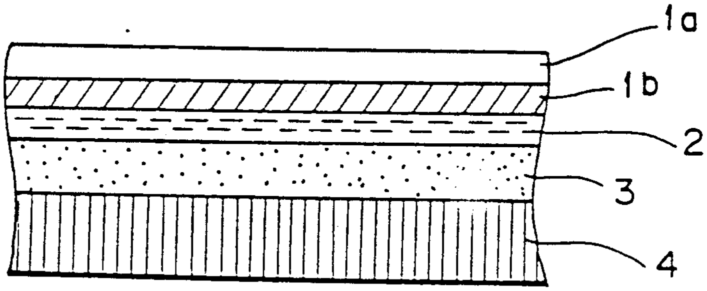

In FIG. 2B, an other example of the structure of the storage panel according to the present invention is shown. The storage panel shown in FIG. 2B has a protective layer 1*b*, having relatively small moisture-absorption characteristics, adjacent to a stimulable layer, and a protective layer la, having relatively large moisture-absorption characteristics, positioned outside of the above. Water present outside of the above radiation image storage panel is retained at the surface and inside of the protective layer 1*a* having large moisture-absorption characteristics and permeated water which cannot be retained in the protective layer 1*a* is prevented from permeating into the stimulable layer by the protective layer 1*b* having small moisture-absorption characteristics. It is particularly preferred that the protective layer 1*b* is composed of a material which is small in moisture-absorption characteristics. Also, another protective layer having small moisture-absorption characteristics may further be formed outside of the protective layer 1*a*.

The constitution of the protective layer of the storage panel according to the present invention is not limited to the examples as shown in FIG. 2.

In the panel of the present invention, it is preferred that among the protective layers of two or more layers which coat the surface of a stimulable layer, at least the outermost protective layer is a layer having a high surface hardness. By providing a protective layer having a high surface hardness, occurence of damages due to physical impacts from a panel conveying system or other machinary parts, etc. during repeated use of the above storage panel and deterioration of image quality of radiation images accompanied by the above can be prevented.

When an organic polymer is used as the protective layer according to the present invention, formation method thereof may be mentioned as shown below.

As the first method, as disclosed in Japanese Provisional Patent Publication No. 42500/1984, there is the method in which a solution prepared by dissolving a polymer material having high transparency in a suitable solvent is coated on a surface which is to be formed a protective layer, and then dried to form a protective layer.

As the second method, as disclosed also in Japanese Provisional Patent Publication No. 42500/1984, there is the method in which a suitable adhesive agent is applied to one surface of a thin film comprising a transparent polymer substance and a protective layer is provided on the surface to be provided.

As the third method, as disclosed in Japanese Provisional Patent Publication No. 176900/1986 there is the method in which a coating solution containing at least one or both of a radiation curing type resin or a thermosetting type resin is coated on the surface to be provided a protective layer and said coating solution is cured by applying irradiation of an ultraviolet ray or an electron beam and/or heating with use of an apparatus as disclosed in the above publication.

Incidentally, at least two protective layers are all not necessarily prepared by the same preparative method.

In the storage panel of the present invention, the protective layers comprise, as described above, a combination of two or more layers having different moisture-absorption characteristics. Among the above protective layers, materials to be used for the protective layer which has relatively small moisture-absorption characteristics may preferably include, for example, a sheet glass, polyethylene, polytetrafluoroethylene, polytrifluoro-chloroethylene, polypropylene, tetrafluoroethylene-hexafluoroethylene copolymer, polyvinylidene chloride, polyvinyl isobutyl ether, polyethylene terephthalate, vinylidene chloridevinyl chloride copolymer, vinylidene chloride-acrylonitrile copolymer, vinylidene chloride-isobutylene copolymer, polystyrene, or epoxy series or acryl series polymer, particularly preferably a sheet glass, polyethylene and polytetrafluoroethylene. Also, materials to be used for the protective layer having relatively large moisture-absorption characteristics may preferably include, for example, polyvinyl alcohol, ethylene-vinyl alcohol copolymer, polyacrylamide, polyglycine, polymethacrylic acid, polyacrylic acid, polyvinyl pyrrolidone, polyvinyl amine, cellulose diacetate, cellulose triacetate, Nylon 4, Nylon 6, Nylon 12, Nylon 66 (all trade names), polyvinyl acetate, polymethylallyl alcohol, etc., particularly preferably polyvinyl alcohol and ethylene-vinyl alcohol copolymer.

Among the embodiments of two or more protective layers of the present invent.:on, particularly preferred is the case where at least one kind of material is selected from the groups mentioned as the materials for the protective layer having small moisture-absorption characteristics and at least one kind of material is selected from the groups mentioned as the materials for the protective layer having large moisture-absorption characteristics, and the former is provided at the outside and the latter is provided at the inside, that is, the side adjacent to a stimulable layer.

A thickness of the protective layer is practically 30 μm to 4 mm and 100 μm or more is preferred in order to obtain good moistureproof property. A thickness of the protective layer of 200 μm or more is preferred since a storage panel which is excellent in durability and lifetime can be obtained. Regarding the thickness of the protective layer, it is preferred that the moisture permeability. of the protective layer is 10 $g/m^2.24$ hr or less, more preferably 5.0 $g/m^2.24$ hr or less from the point of moistureproofness. The moisture permeability was measured according to the cup method (JIS Z 0208).

The protective layer in the storage panel of the present invention has preferably a haze ratio (haze value) as defined according to JIS K6714 (Japanese Industrial Standard, Methacryl resin plates for air plane, JIS K6714-1977, pp. 13 to 14) of 3% or less, more preferably 1% or less.

For example, an example of a borosilicate glass with a thickness of 500 μm has a haze ratio of 0.6% and exhibits a transmittance of 80% or higher within the wavelength range of 330 nm to 2.6 μm. An example of a quartz glass with a thickness of 500 μm has a haze ratio of 0.0% and exhibits higher transmittance even at shorter wavelength than in the case of the borosilicate glass.

The haze ratio will vary depending on the thickness of the protective layer and the surface treatment. If the protective layer is a plate glass, one having higher polishing grade has generally lower haze ratio. On the other hand, if it is a plastic film, one applied with lamination or one with the surface subjected to matting working, embossing working has generally higher haze ratio.

As the material for forming the protective layer, the above-mentioned plate glass is preferred for excellent transmittance and humidity preventive characteristic along with haze ratio.

Also, when an anti-reflective layer such as $MgF_2$, etc. is provided on the surface of the protective layer, it is preferred since a stimulating light and a stimulated emission light are effectively permeated and it has an effect whereby lowering in sharpness is made small.

The refractive index of the protective layer is not particularly limited, but in practice, in the range of 1.4 to 2.0 is general.

The lower refractive index layer of the storage panel according to the present invention comprises a material having a lower refractive index than that of the protective layer. By the presence of this layer, even if the protective layer is made thick, lowering in sharpness can be made small. For example, materials shown in Table 2 may be employed and it is preferred to use them in the state of a thin film formed by the vapor deposition method. Or else, liquid layers as shown in Table 3 may be used. Also, when a gaseous layer such as air, nitrogen or argon or a vacuum layer which has a refractive index of substantially 1 is used, it is particularly preferred since its effect of preventing lowering in sharpness is remarkable.

A thickness of the lower refractive index layer is practically in the range of from 0.05 μm to 3 mm.

TABLE 2

| Material | Refractive index |
|---|---|
| $CaF_2$ | 1.23 to 1.26 |
| $Na_3AlF_6$ | 1.35 |
| $MgF_2$ | 1.38 |

TABLE 2-continued

| Material | Refractive index |
|---|---|
| $SiO_2$ | 1.46 |

TABLE 3

| Material | Refractive index |
|---|---|
| Ethyl alcohol | 1.36 |
| Methyl alcohol | 1.33 |
| Diethyl ether | 1.35 |

pp The lower refractive index layer of the present invention may be in close adherence state with or apart from a stimulable layer, but it is the close adherence state with the stimulable layer which is preferred in order to make small the lowering in sharpness to the lower refractive index layer sufficiently. Therefore, when the lower refractive index layer is a liquid layer, a gaseous layer or a vacuum layer, it may be as it is. However, when the lower refractive index layer is formed on the surface of the protective layer with the above $CaF_2$, $Na_2AlF_6$, $MgF_2$, $SiO_2$, etc., the stimulable layer and the lower refractive index layer should be adhered with, for example, an adhesive agent. In this case, the refractive index of the adhesive agent is preferably similar to that of the stimulable layer.

Figure 3:
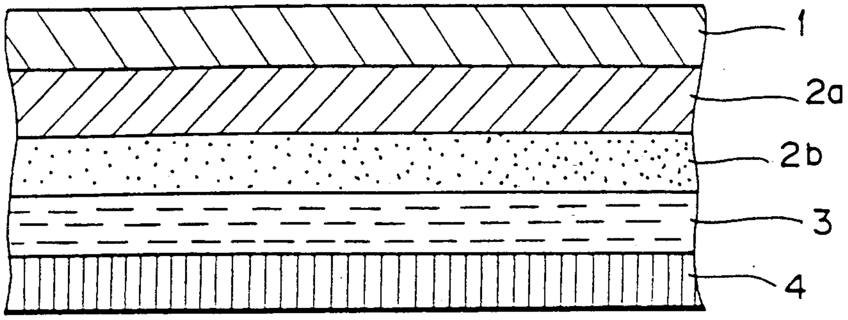

The storage panel of the present invention as shown in the partial sectional view in FIG. 3, may have the structure that a first layer having a lower refractive index than a protective layer is provided between said stimulable phosphor layer and said protective layer, and a second layer having a higher refractive index than the first layer is provided between said first layer and said stimulable phosphor layer.

In FIG. 3, 1 is a protective layer, 2*a* is a first layer, 2*b* is a second layer, 3 is a stimulable layer and 4 is a support. In the following, the first layer 2*a* is called a lower refractive index layer and the second layer 2*b* is called a higher refractive index layer.

The first layer (a lower refractive index layer) may use the same material as in the lower refractive index layer used for the storage panel according to the present invention shown in FIG. 1. The thickness of the lower refractive index layer is practically within the range of 0.05 μm to 3 mm.

The second layer (a higher refractive index layer) may comprise a substance which has higher refractive index than that of the first layer. For example, an organic polymer film such as PET may be used, or a deposition substance used for an anti-reflection film, etc. may be used. As deposition substances, there may be mentioned, for example, those as shown in Table 4.

A thickness of the higher refractive index layer is practically in the range of 30 nm to 500 μm. However, in order to heighten the effect of making small the lowering in sharpness, 50 μm or less is preferred and 10 μm or less is more preferred.

The higher refractive index layer may be adhered to or separated from a stimulable layer. For adhering the higher refractive index layer and the stimulable layer, one method employs an adhesive agent is one of the method. In this case, the refractive index of the adhesive agent is preferably similar to that of the stimulable layer or that of the higher refractive index layer.

TABLE 4

| Material | Refractive index |
|---|---|
| $Al_2O_3$ | 1.62 |

TABLE 4-continued

| Material | Refractive index |
|---|---|
| $Sb_2O_3$ | 2.04 |
| $CeO_2$ | 2:42 |
| $CeF_3$ | 1.63 |
| $La_2O_3$ | 1.95 |
| $LaF_3$ | 1.59 |
| $PbF_3$ | 1.75 |
| $NdF_3$ | 1.60 |
| $Pr_6O_{11}$ | 1.92 |
| SiO | 2.0 |
| $SiO_2$ | 1.46 |
| $TiO_2$ | 2.2 to 2.7 |
| $ThO_2$ | 1.8 |
| $ThF_4$ | 1.52 |
| ZnS | 2.35 |
| $ZrO_2$ | 2.1 |

In addition, if a substance which is high in moisture-absorption characteristics is employed as the higher refractive index layer, better humidity resistance can be provided. Here, the moisture-absorption characteristics means equilibrium moisture absorbance.

When a substance which is high in moisture-absorption characteristics is employed for the higher refractive index layer 3 in FIG. 3, the higher refractive index layer adsorbs and retains water permeated through the protective layer 1 and the lower refractive index layer *2a* and/or water permeated through edge portions of the storage panel so that it functions to prevent arrival of water to the stimulable layer. It also functions to make the stimulable layer drier because a second intermediate layer having high moisture-absorption characteristics takes water adsorbed to the stimulable layer when manufacturing the storage panel. Therefore, by using a protective layer having a relatively thicker thickness and low moisture permeability, and further by using a substance having higher moisture-absorption characteristics for the higher refractive index layer (the second intermediate layer), a storage panel having excellent humidity resistance can be prepared. A higher value of equilibrium moisture absorbance of the second intermediate layer is preferred. The equilibrium moisture absorbance of the second intermediate layer at a temperature of 25° C. and a relative humidity of 65% is practically 1% or more, 2% or more is preferred and 5% or more is particularly preferred. As materials having higher moisture-absorption characteristics may be selected from organic polymer materials. Preferred examples of the organic polymer having relatively higher moisture-absorption characteristics may include, for example, polyvinyl alcohol, polyacrylamide, polyglycine, polymethacrylic acid, polyacrylic acid, polyvinyl pyrrolidone, polyvinyl amine cellulose diacetate, cellulose triacetate, Nylon 4, Nylon 6, Nylon 12, Nylon 66 (all trade names), polyvinyl acetate, polymethyallyl alcohol, etc. The material for the second intermediate layer having higher moisture-absorption characteristics is not limited to only the organic polymers, and any materials may be employed so long as they have high equilibrium moisture absorbance.

Figure 4:
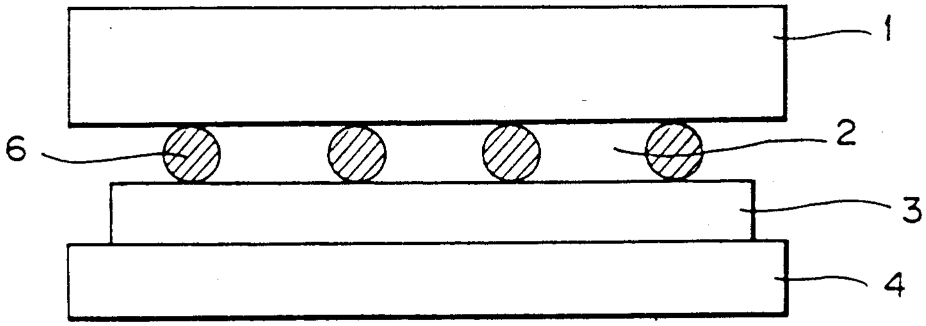

In the present invention, when a gaseous layer or a vacuum layer is provided as the lower refractive index layer, for example, there is the method in which, as shown in FIG. 4, a spacer material 6 is sprayed between the protective layer and the stimulable layer to provide a gaseous layer or a vacuum layer. As the material for the spacer, fŏr example, preferred is fine glass fiber tips having a diameter of several μm which have been used as a spacer material for a liquid crystal panel. Also, as shown in FIG. 5, there is the method in which a protective layer supporting member (hereinafter sometimes abbreviated to "spacer") having a thickness thicker than that of the stimulable layer is provided at edge portions of the storage panel to retain a constant thickness.

In the FIG. 1, is a protective layer, 2 is a lower refractive index layer, 3 is a stimulable layer, 4 is a support and 5 is a protective layer supporting member, respectively.

Figure 5:
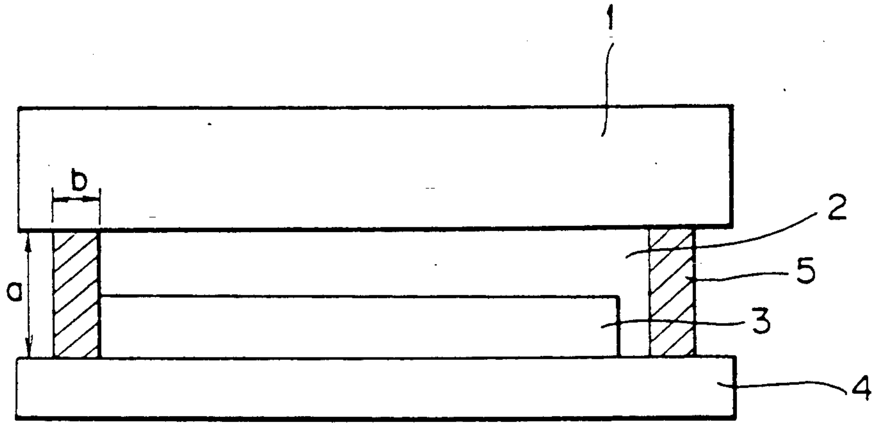

The storage panel shown in FIG. 5 has a stimulable layer 3, a lower refractive index layer 2 and a protective layer 1 on a support 4 in this order, and it further has a protective layer supporting member 5 as its constituting element. The stimulable layer 3 is surrounded by the protective layer supporting member 5 at the state of sealing from outer atmosphere. One edge of the protective layer supporting member 5 is adhered to the support 4, and the other edge is adhered to the protective layer 1. Also, edge portions of the stimulable layer 3 and the protective layer supporting member 5 may be contacted with each other or may be separated. Accordingly, the lower refractive index layer 2 and the stimulable layer 3 are constituted at the state of sealing from outer atmosphere by the protective layer 1, the support 4 and the protective layer supporting member 5.

The protective layer supporting member to be used in the storage panel according to the present invention shown in FIG. 5, is not particularly limited so long as a lower refractive index layer can be formed under the conditions of sealing from outer atmosphere, and so long as a glass, a ceramics, a metal, a plastic, etc. can be employed.

Also, the protective layer supporting member may preferably have the moisture permeability of 10 $g/m^2 \cdot 24$ hr or less. If the moisture permeability is too large, it is not preferred since the stimulable phosphor deteriorates due to water permeated from outside.

A thickness of the protective layer supporting member (a in FIG. 5) may be a thickness thicker than that of the stimulable layer. That is, the thickness of the protective layer supporting member may be the same thickness with or exceed that of the stimulable layer.

Where the thicknesses of the protective layer supporting member and the stimulable layer are the same as each other, for example, the lower refractive index layer is a vacuum layer. In this case, if the vacuum layer is present so as to optically discontinue between the stimulable layer and the protective layer, it is sufficient as the lower refractive index layer. Thus, these two layers may be in the state of contact with each other.

In case where the thickness of the protective layer supporting member exceeds that of the stimulable layer, the thickness of the protective layer supporting member can be determined in connection with the thickness of the lower refractive index layer to be formed.

The width of the protective layer supporting member (b in FIG. 5) is determined mainly in connection with the moisture resistance (the above moisture permeability) of an adhered portion of the protective layer supporting member with a support and a protective layer, and is preferably 1 to 30 mm. If the width of the protective layer supporting member is too small, it is not preferred from points of stability, strength and moisture resistance of the protective layer supporting member. Also, if it is too large, it is not preferred since the storage panel becomes a large sized one exceeding necessity. Moisture permeability at the adhered portion of the protective layer supporting member with the support and the protective layer may preferably be 10 g/$m^2$·24 hr or less.

The protective layer supporting member is necessarily adhered to the support and the protective layer in order to provide moisture resistance to the storage panel and to retain the layer thickness of the lower refractive index layer constantly. Here, in order to adhere the protective layer supporting member to the support and the protective layer, for example, an adhesive agent is used. As the adhesive agent, those having moisture resistance are preferred. More specifically, there may be employed an organic polymer series adhesive agent such as an epoxy series resin, a phenol series resin, a cyanoacrylate series resin, a vinyl acetate series resin, a vinyl chloride series resin, a polyurethane series resin, an acrylic series resin, an ethylene-vinyl acetate series resin, a polyolefin series resin, a chloroprene series rubber, a nitrile series rubber, etc., or a silicone series adhesive agent, etc. Among them, an epoxy series resin or a silicone series resin used for encapsulation of a semiconductor device or an electonic part is preferred since they are excellent in moisture resistance. Particularly, an epoxy resin series adhesive agent is suitable since it is low in moisture permeability.

In order to improve adhesiveness at the adhered portions of the protective layer supporting member and the support or the protective layer supporting member and the protective layer, a subbing layer may be formed at the contacting surfaces of the protective layer supporting member, the support and the protective layer with other layer or may be subjected to a roughening treatment of the surfaces thereof.

The lower refractive index layer may comprise a substance which has lower refractive index than that of the protective layer, and by the presence of the layer, lowering in sharpness can be made small even if the thickness of the protective layer is made thick. As the material to be constituting the lower refractive index layer, it is not limited at all so long as it has a lower refractive index than that of the protective layer.

In the storage panel of the present invention, it is effective to employ, as a material for the protective layer supporting member, a material which has higher moisture-absorption characteristics than those of the stimulable phosphor.

In this case, as the material for the protective layer supporting member, there may be employed, for example, water absorptive polymer such as polyvinyl alcohol, ethylene-vinyl alcohol copolymer, polyacrylamide, polyglycine, polymethacrylic acid, polyacrylic acid, polyvinyl pyrrolidone, polyvinyl amine, cellulose diacetate, cellulose triacetate, Nylon 4, Nylon 6, Nylon 12, Nylon 66 (all tradenames), polyvinyl acetate, polymethylallyl alcohol, etc., or a moisture absorptive sheet dispersing a moisture absorbing agent such as a silica gel, calcium carbonate, etc. in a polymer, and the like.

A spacer 6 may have shapes, for example, as shown in FIGS. 9 to 12. In addition, whole parts of the spacer comprise a material having moisture-absorption characteristics. That is, it takes various shapes that a part of the spacer comprises a material having moisture-absorption characteristics.

Figure 8:
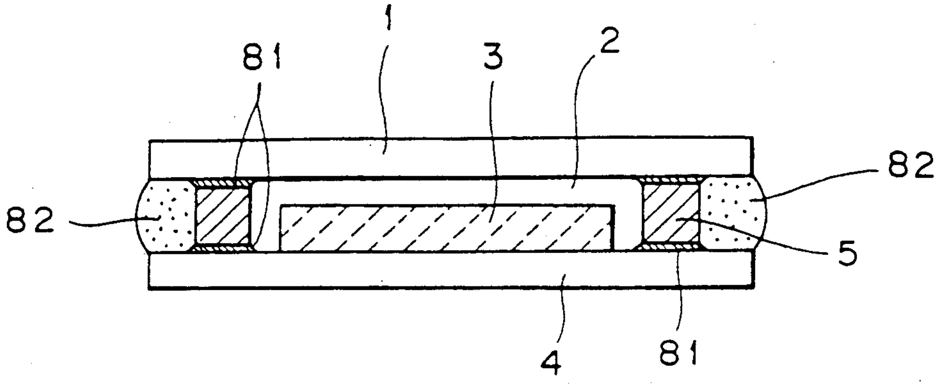

In this case, the storage panel of the present invention may preferably have a structure such as that shown in FIG. 8, where the outside of the spacer or edges of the storage panel are sealed with a sealing member 82 since moistureproof effect can be heightened. Particularly, it is preferred that the spacer portion having moisture-absorption characteristics should not be exposed to the open air directly. Also, the above structure should be done in case that the moisture permeability of the spacer exceeds 10 g/$m^2$·24 hr.

For sealing, the methods wherein sealing is carried out by glass fusion using the above sealing member or a glass for sealing such as a low melting point glass, etc., or by sealing at an elongated portion of the protective layer may be mentioned. Particularly, the glass fusion is excellent in hermetic property. In this case, the spacer may only adhere to the support and/or the protective layer.

Figure 6:
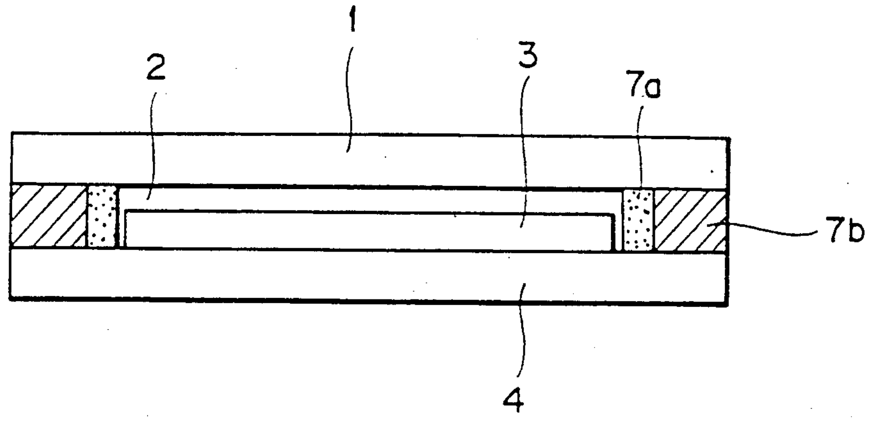

For providing better moisture resistance to the storage panel of the present invention, it is prefered to make a structure in which, as shown in FIG. 6, a first moistureproof member with a thickness the same with or thicker than that of the stimulable phosphor layer is provided between the support and the protective layer so as to seal 5 edges of the stimulable phosphor layer. And a void portion formed by the first moistureproof member, the support and the protective layer is filled with a second moistureproof member.

In FIG. 6, 1 is a protective layer, 2 is a lower refractive index layer, 3 is a stimulable layer, 4 is a support, *7a* is a first moistureproof member and *7b* is a second moistureproof member.

The storage panel of the present invention shown in FIG. 6 has, on a support 4, a stimulable layer 3 and a protective layer 1 in this order and it includes, as the other constituting elements, a first moistureproof member *7a* and a second moistureproof member *7b*. The first moistureproof member *7a* is provided at edge portions of the stimulable layer 3, and one end of the first moistureproof member *7a* is adhered to the support, and the other end thereof is adhered to the protective layer 1. Also, edge portions of the stimulable layer 3 and the first moistureproof member *7a* may be contacted with or separated from each other. In a void portion of the edge portions of the first moistureproof member, or the void portion formed by the protective layer 1, the first moistureproof member *7a* and the support, a second moistureproof member *7b* is filled therein.

In the storage panel of the present invention shown in FIG. 6, it is the most important characteristic feature that the first moistureproof member and the second moistureproof member are present between the support and the protective layer. Here, the second moistureproof member functions to prevent permeation of water from outer atmosphere into inside of the storage panel, and the first moistureproof member functions to prevent permeation of a small amount of water which is passed through the second moistureproof member to the side of the stimulable layer.

The first moistureproof member and the second moisture-proof member are not limited so long as they have moisture resistance, but it is preferred that moisture permeability of the first moistureproof member is lower than that of the second moistureproof member. Objects of the first moistureproof member include constantly maintaining the distance between the support and the protective layer by supporting the protective layer as well as to prevent permeation of a small amount of water passed through the second moistureproof member to the side of the stimulable layer. An object of the second moistureproof member is to prevent permeation of water from the outer atmosphere in the bud.

Accordingly, from such a difference of the objects, moisture permeability of both of the moistureproof member is preferably regulated as follows. That is, it is preferred that the first moistureproof member preferably has moisture permeability of 10 $g/m^2 \cdot 24$ hr or less, and more preferably 5 $g/m^2 \cdot 24$ hr or less. Also, moisture permeability of the second moistureproof member is preferably 20 $g/m^2 \cdot 24$ hr or less, and more preferably 10 $g/m^2 \cdot 24$ hr or less. Here, the moisture permeability was measured according to the cup method (JIS Z 0208). Further, moisture permeability at the adhered portion of the moistureproof material with the protective layer and the support is preferably the same or inferior to that of the moisture-proof member.

Also, as the second moistureproof member, from its object, it is required to adhere to the support and the protective layer.

As the first moistureproof member, preferably used are, for example, those which are processed into a sheet such as glass, ceramic, metal, polymer materials, etc.

Here, as the materials using a glass, a chemically reinforced glass, a crystallized glass, etc. may be mentioned. As the materials using a ceramics, a sintered plate of alumina or zirconia may be mentioned. As the materials using a metal, a metal sheet or a metal plate of aluminum, iron, copper, chromium, etc., or materials of which the above metal sheet or the metal plate is coated with an oxide of the above metal may be mentioned. As the materials using a polymer material, films of cellulose acetate, polyester, polyethylene terephthalate, polyamide, polyimide, triacetate, polycarbonate, etc. may be mentioned.

As the second moistureproof member, materials as in the first moistureproof member may be exemplified, but in addition to the above, there may be mentioned a resin which cures by mixing two liquids such as a two pack-type urethane series adhesive agent, a two pack-type modified acrylate series adhesive agent, a two pack-type modified acrylic series adhesive agent, a two pack-type epoxy series adhesive agent to effect polycondensation reaction or cross-linking reaction; or a radiation cure type resin which cures an energy of an electromagnetic wave or a corpuscular beam by irradiation of an electromagnetic wave or a corpuscular beam such as X-ray, $\alpha$-ray, $\beta$-ray, $\gamma$-ray, high energy neutron beam, electron beam, ultraviolet ray, etc.

Figure 7A:
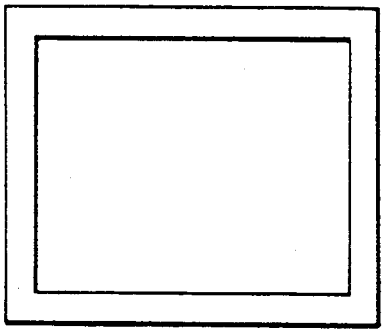
FIG. 7 is a view showing one example of a worked shape of a first moistureproof member.
Figure 7B:
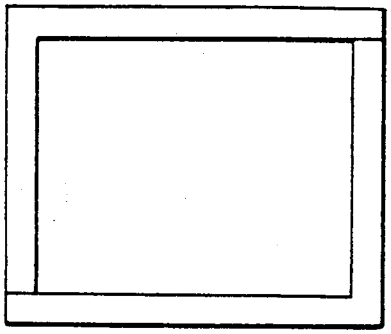
Figure 7C:
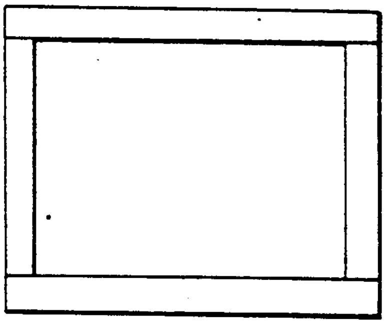

The first moistureproof member is positioned so as to surround the stimulable layer after processing to the shape as shown in FIG. 7 when a sheet like member is used. FIG. 7 is a drawing showing one example of the processed shape of the first moistureproof member. FIG. 7A is one hollowed into the shape of box and it is particularly excellent in moisture resistance due to its lack of a joint. FIG. 7B is one which combine two moistureproof members having an L character shape, and FIG. 7C is one combining four stick like sheets. For adhesion of the first moistureproof member and the support or the protective layer, an adhesive agent to be used as the above second moistureproof member may be applied as preferred ones. In case where moisture resistance of the second moistureproof member is high and moisture permeability thereof is 5.0 $g/m^2 \cdot 24$ hr or less, the first moistureproof member may function substantially only to retain the protective layer. In this case, the first moistureproof member must not necessarily to adhere to the support and the protective layer.

In the case where a sheet like material is used as the second moistureproof member, it is necessary to adhere this with the support and the protective layer, and as the adhesive agent to be used therefor, the adhesive agent which is used as the above second moistureproof member may be used.

Thicknesses of the first and the second moistureproof members may not be limited so long as they are the same or thicker than that of the stimulable layer.

Widths of the first and the second moistureproof members are preferably as wide as possible since moisture resistance becomes high, but practically it is 1 to 30 mm, more preferably 2 to 10 mm. If the width is too narrow, not only moisture resistance becomes low but also moisture resistance remarkably lowers due to defects such as pinholes. If the width is too wide, it is not preferred since the effectively utilizable area of the storage panel decreases.

In the case where a lower refractive index layer is provided, it is necessary to make the thicknesses of the first and the second moistureproof members the same with or thicker than that of the stimulable layer. Even if the thicknesses of the first and the second moistureproof members are the same with that of the stimulable layer, if the stimulable layer is not adhered to the protective layer with an adhesive agent, etc., a lower refractive index layer can be provided between the protective layer and the stimulable layer.

Also, in the storage panel of the present invention shown in FIG. 6, a first moistureproof member 7*a* and a second moistureproof member 7*b* are provided between a support 4 and a protective layer 1 and modulus of elasticity of the first moistureproof member may be made lower than that of the second moistureproof member. Here, the second moistureproof member functions to prevent permeation of water from the outer atmosphere into the inside of the storage panel, and the first moistureproof member functions to prevent permeation of a small amount of water which is passed through the second moistureproof member to the side of the stimulable layer.

The first moistureproof member and the second moisture-proof member are not limited so long as they have moisture resistance and so long as modulus of elasticity of the first moistureproof member is lower than that of the second moistureproof member. However, it is preferred that moisture permeability of the first moistureproof member is lower than that of the second moistureproof member since an object of the first moistureproof member is to constantly maintain the distance between the support and the protective layer by supporting the protective layer as well as to prevent permeation of a small amount of water passed through the second moistureproof member to the side of the stimulable layer, and an object of the second moistureproof member is to prevent permeation of water from the outer atmosphere into the bud.

As the first moistureproof member, preferably used are, for example, those which are processed into a sheet such as glass, ceramic, metal, polymer materials, etc.

Here, as the materials using a glass, a chemically reinforced glass, a crystallized glass, etc. may be mentioned. As the materials using a ceramics, a sintered plate of alumina or zirconia may be mentioned. As the materials using a metal, a metal sheet or a metal plate of aluminum, iron, copper, chromium, etc., or materials of which the above metal sheet or the metal plate is coated with an oxide of the above metal may be mentioned. As the materials using a polymer material, films of cellulose acetate, polyester, polyethylene terephthalate, polyamide, polyimide, triacetate, polycarbonate, polyethylene, epoxy resin, etc.; sheets of butadiene-styrene rubber, butadieneacrylonitrile rubber, isoprene rubber, chlorosulfonated polyethylene rubber, isobutylene rubber, isobutylene-isoprene rubber, acrylic rubber, polysulfide synthetic rubber, urethane rubber, natural rubber, propylene rubber, styrene rubber, butadiene rubber, silicone rubber, fluorine rubber, etc. may be mentioned.

As the second moistureproof member, materials as in the first moistureproof member may be exemplified, but in addition to the above, there may be mentioned a resin which cures by mixing two liquids such as a two pack-type urethane series adhesive agent, a two pack-type modified acrylate series adhesive agent, a two pack-type modified acrylic series adhesive agent, a two pack-type epoxy series adhesive agent to effect polycondensation reaction or cross-linking reaction; or a radiation cure type resin which cures an energy of an electromagnetic wave or a corpuscular beam by irradiation of an electromagnetic wave or a corpuscular beam such as X-ray, $\alpha$-ray, $\beta$-ray, 65 -ray, high energy neutron beam, electron beam, ultraviolet ray, etc.

Here, the modulus of elasticity herein mentioned means the longitudinal modulus (Young's modulus), and the above moistureproof member is so selected that the modulus of elasticity of the first moistureproof member is lower than that of the second moistureproof member. By setting the modulus of elasticity of the first moistureproof member lower than that of the second moistureproof member, it can be possible to prevent defects of a protective layer and/or a support of the storage panel by absorbing thermal strain at sealing of the storage panel using the second moistureproof member. Examples of the combination of such a first moistureproof member and a second moistureproof member, there may be mentioned urethane rubber-polyethylene, polyethylene-epoxy resin, polyamide-unsaturated polyester, silicone rubber-epoxy resin, etc.

The storage panel of the present invention may have a structure, as shown schematic sectional view in FIG. 22, such that edge portions of the stimulable layer may be sealed with a sealing medium comprising an elastomer having moistureproof characteristics and low modulus of elasticity (hereinafter abbreviated to "elastic sealing medium").

In FIG. 22, 1 is a protective layer, 2 is a lower refractive index layer, 3 is a stimulable layer, 4 is a support, 10 is an elastic sealing medium and 5 is a protective layer supporting member.

Figure 9:
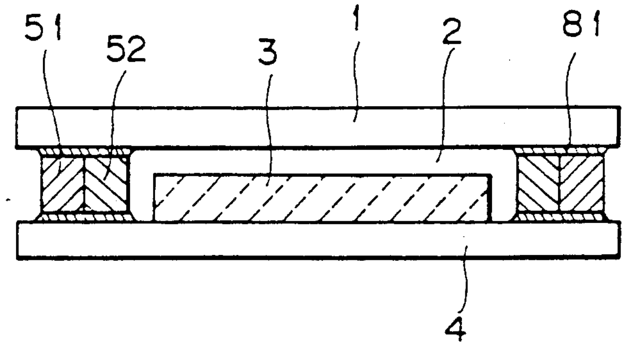
Figure 10:
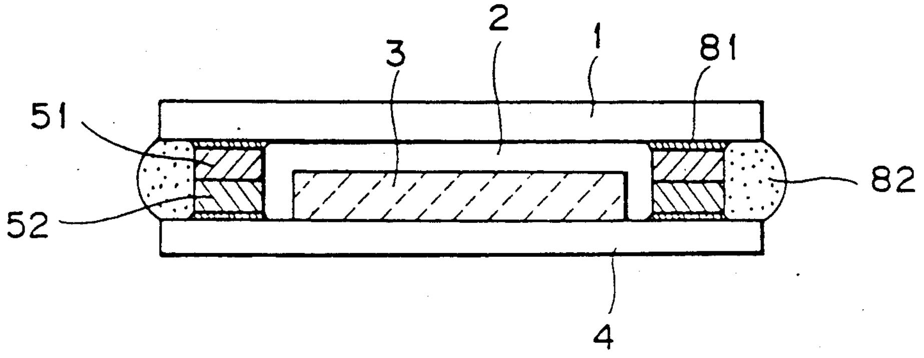
Figure 11:
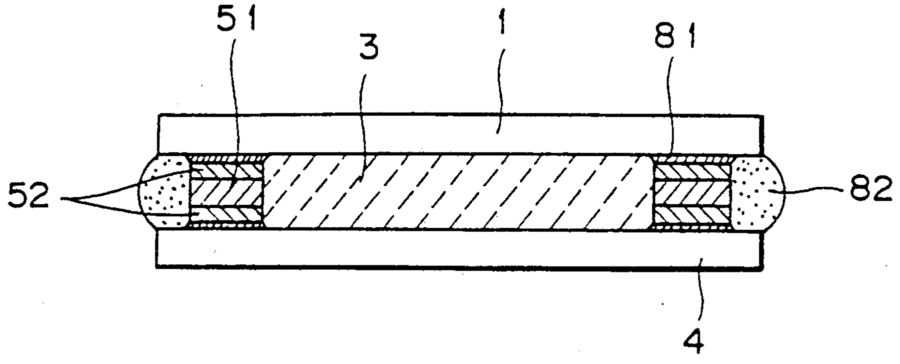
Figure 12:
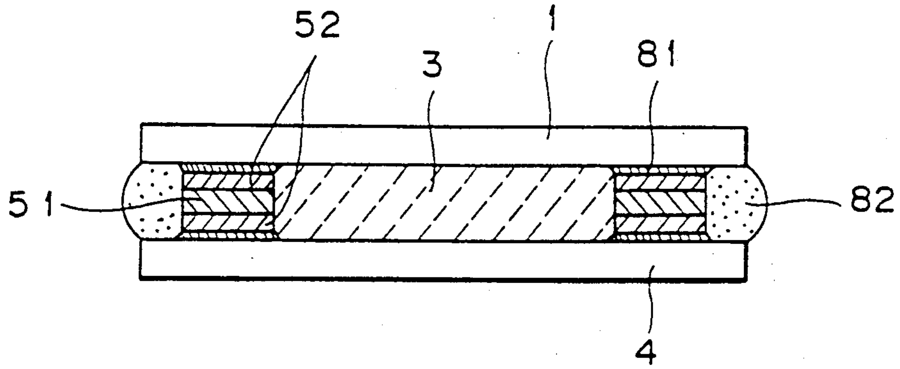
Figure 22A:
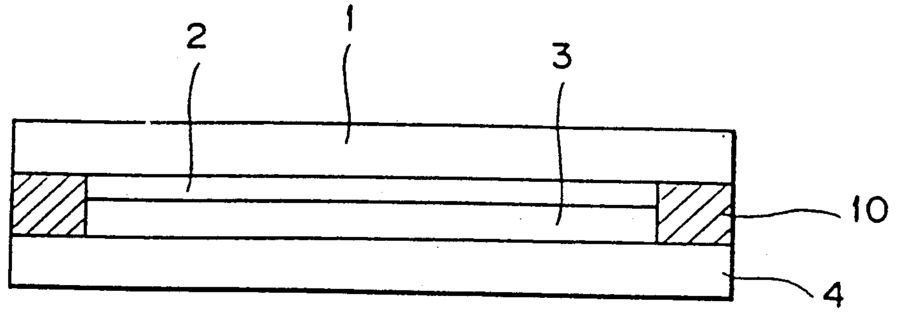

The storage panel has, as shown in FIG. 22A, on a support 4, a stimulable layer 3, a lower refractive index layer 2 and a protective layer 1 in this order. Edge portions of the stimulable layer 3 is sealed with an elastic sealing medium 10 as shown in FIG. 9. By sealing with this elastic sealing medium 10, the stimulable layer 3 is shut out from outer atmosphere so that permeation of water is prevented. Also, in the storage panel of the present invention, the embodiment having a lower refractive index layer 5 between the stimulable layer 2 and the protective layer 1 is included. Further included in the storage panel of the present invention shown in FIG. 2A is the embodiment having a protective layer supporting member 5 provided at edge portions of the stimulable layer 3 and edge portions of the protective layer supporting member 5 sealed with an elastic sealing medium 10.

An elastic sealing medium to be used in the storage panel of the present invention shown in FIG. 22 comprises an elastomer having moisture resistance and low modulus of elasticity. Accordingly, those which can prevent permeation of water from outside, and absorb warpage or strain due to difference of thermal expansion coefficients between the support and the protective layer caused by heat at preparation steps or temperature change at the time of using the storage panel so that no damage is provided to the stimulable layer are preferred.

Regarding moisture resistance of the elastomer constituting the elastic sealing medium, it preferable to have moisture permeability at the state of sealing the storage panel be 20 $g/m^2$ 24 hr or less, more preferably 10 $g/m^2 \cdot 24$ hr or less.

Also, the modulus of elasticity mentioned in the present invention means the longitudinal modulus (Young's modulus), and the modulus of elasticity of the elastomer constituting the above elastic sealing medium is preferably 100 $kg/mm^2$ or less, more preferably 10 $kg/mm^2$ or less.

As such elastic sealing media, there may be mentioned, for example, low-density polyethylene, soft epoxy resin, natural rubber, propylene rubber, styrene rubber, butadiene rubber, silicone rubber, fluorine rubber, butadienestyrene rubber, butadiene-acrylonitrile rubber, isoprene rubber, chlorosulfonated polyethylene rubber, isobutylene rubber, isobutylene-isoprene rubber, acrylic rubber, polysulfide synthetic rubber, urethane rubber, etc.

Sealing of a support and a protective layer of a storage panel due to the above elastic sealing medium may be carried out by pouring a liquid sealing medium into void portion formed by the support and the protective layer and then solidifying the sealing medium. Alternatively, elastic sealing medium which is previously molded into a sheet shape can be used.

A width of the elastic sealing medium is determined mainly in connection with moisture resistance at the adhered portion of this elastic sealing medium with the support and the protective layer, and it is preferred to be in the range of 1 to 30 mm. If the width of the elastic sealing medium is too small, it is not preferred due to points of stability, strength and moisture resistance of the elastic sealing medium. Also, if it is too large, it is not preferred since the storage panel becomes a large sized one exceeding necessity. Moisture permeability at the adhered portion of the elastic sealing medium with the support and the protective layer may preferably be 20 $g/m^2 \cdot 24$ hr or less.

It is necessary to adhere the elastic sealing medium to the support and the protective layer in order to provide moisture resistance to the storage panel. Here, in order to adhere the elastic sealing medium to the support and the protective layer, when the elastic sealing medium is a sheet shape, for example, an adhesive member, etc. is used as shown in FIG. 5. As the adhesive member, those having moisture resistance are preferred. More specifically, there may be employed an organic polymer series adhesive agent such as an epoxy series resin, a phenol series resin, a cyanoacrylate series resin, a vinyl acetate series resin, a vinyl chloride series resin, a polyurethane series resin, an acrylic series resin, an ethylenevinyl acetate series resin, a polyolefin series resin, a chloroprene series rubber, a nitrile series rubber, etc., or a silicone series adhesive agent, etc.

Figure 22B:
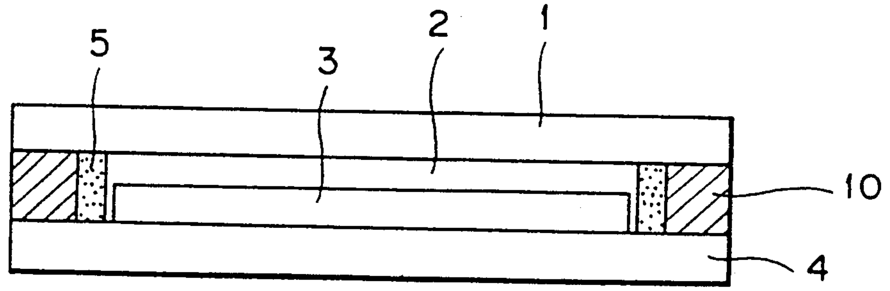

In the storage panel of the present invention, as shown in FIG. 22B, the protective layer supporting member may be made its constituting element. In this case, it is preferred since a refractive index layer can be provided as in the embodiment shown in FIG. 3. In the case where the protective layer supporting member is provided as mentioned above, sealing by an elastic sealing medium is effected at edge portions of the protective layer supporting member as shown in FIG. 22B.

As the protective layer supporting member, materials having moisture resistance and/or elastic property as in the elestic sealing medium are preferred. For example, a glass, ceramic, and various kinds of polymer sheets may be mentioned. In case where the protective layer supporting member has insufficient elastic property, the protective layer supporting member is preferably not adhered and fixed to both the support and the protective layer at the same time.

Figure 23:
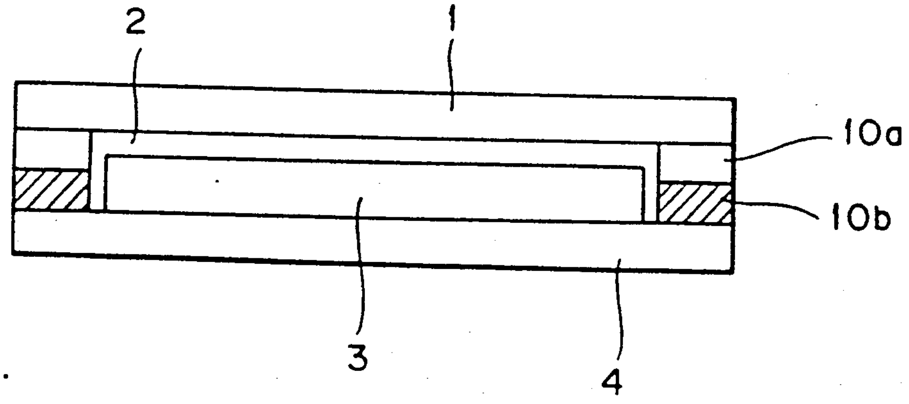

The elastic sealing medium may have a shape, for example, as shown in FIG. 23. That is, it may have various shapes such that a part of the elastic sealing medium is an elastic sealing medium 10*a* (sealing medium having a low modulus of elasticity) and the other part is a non-elactic sealing medium 10*b* (sealing medium having a high modulus of elasticity).

Next, a process for preparing the storage panel will be explained by referring to one example.

First, after forming a stimulable layer on a support according to the coating method or the vapor phase buildup method, a protective layer supporting member is adhered onto the support by an adhesive agent so as to surround the stimulable layer. Next, one end of the protective layer supporting member (opposite portion to the adhered portion of the support) is similarly adhered to the protective layer. By carrying out the chain of steps in the normal atmosphere, a lower refractive index layer of an air layer can be made. Also, by injecting a liquid from a void provided at a part of the protective layer or by making vacuum, a lower refactive layer can be made a liquid layer or a vacuum layer.

Other processes for preparing the storage panel will be explanined by referring to examples.

First, after forming a stimulable layer on a support according to the vapor phase build-up method such as the vacuum deposition method, a first moistureproof member is adhered onto the support by an adhesive agent so as to surround the stimulable layer. Next, one end of the first moistureproof member (opposite portion to the adhered portion of the support) is similarly adhered to the protective layer. Thereafter, by filling a second moistureproof member as shown in FIG. 6, the storage panel can be obtained.

Another method which may be applied is the method in which after a first moistureproof member is adhered onto a support (or a protective layer) with an adhesive agent, a second moistureproof member is provided at the outside of the first moistureproof member, and then a protective layer (or a support) is covered thereon and adhered.

Also available is the process for preparing the storage panel in which a notch which functions as a vent hole is formed on a protective layer and after heating and drying the radiation image storage panel, said notch is closely sealed.

Figure 13:
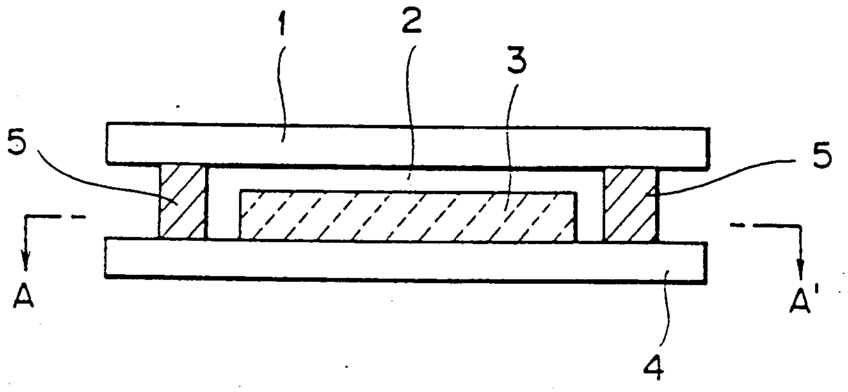
Figure 14:
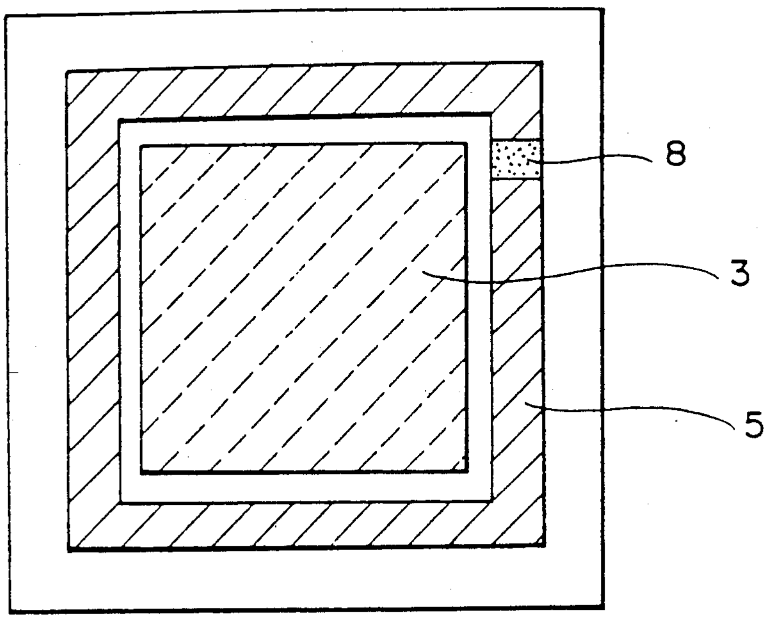
FIGS. 14 and 19 are plane views of FIGS. 13 and 18, respectively.
Figure 15:
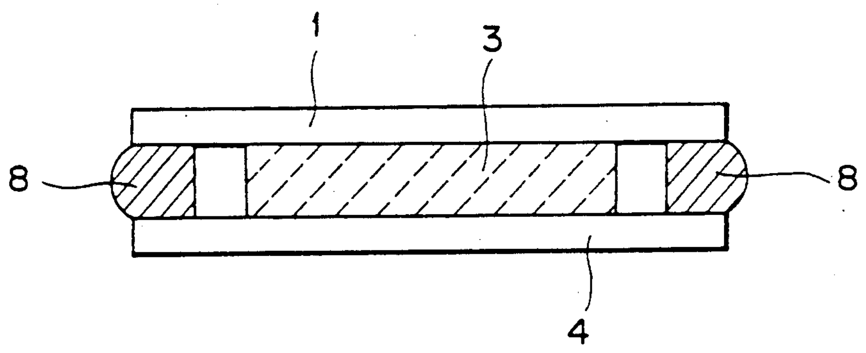
Figure 16:
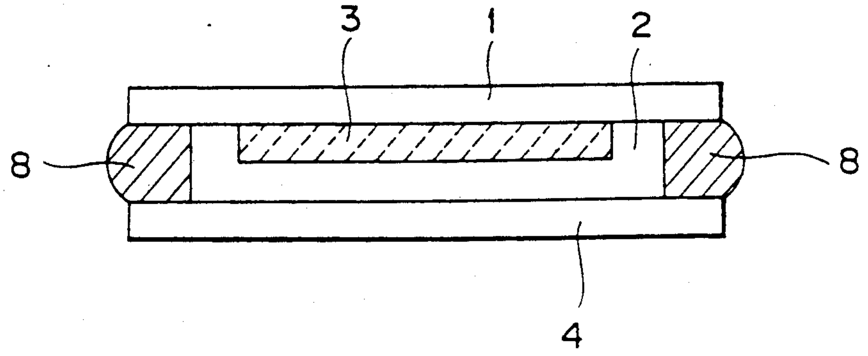

FIG. 13 and FIG. 14 schematically show one example of the storage panel prepared according to the present invention and 1 is a protective layer, 2 is a lower refractive index layer, 3 is a stimulable layer, 4 is a support, 5 is a protective layer supporting member and 6 is a sealing medium sealed a notch.

A notch of a spacer may be present at any portion of the spacer and may be any spot, but preferably 1 or 2 spots. The width of the notch may vary depending on the size of the storage panel and numbers of notch(es), but it is suitably selected from the range of 2 to 40 mm. If the width is to narrow, drying is not sufficiently carried out. On the other hand, if it is too wide, it is not preferred since sealing or close with an adhesive agent becomes difficult and durability lowers.

Heating and drying are carried out at 40 to 100° C. for 0.1 to 3 hours and preferably under reduced pressure which gives a high moistureproof effect.

Immediately after heating and drying, a notch(es) is sealed to close by using, for example, the above adhesive agent. After drying, if air in the inner portion of the storage panel is replaced with a dried gas, it is preferred since initial characteristics of the storage panel can be improved. Also, it is preferred that sealing of the notch(es) is carried out in a dried gas atmosphere since permeation of water from the notch(es) can be prevented.

Since the radiation image storage panel prepared according to the present invention is maintained in a dried state in its inner portion, the storage panel in which the stimulable layer is hardly deteriorated and in which initial characteristics are improved can be provided.

In the present invention, it is preferred that a dried gas is encapsulated between the above-mentioned support and the protective layer. Preferred dried gas to be used may include an inert gas such as He, Ne, Ar, etc., or $O_2$, $H_2$, $N_2$, $CO_2$, air, etc., and these gases may be used singly or in combination of two or more. Prefered are an inert gas and $N_2$.

The moisture content of the dried gas is 5.0 mg/liter or less, preferably 0.2 mg/liter or less and more preferably 0.02 mg/liter or less.

The pressure of the dried gas is preferably made slightly higher than that used by the storage panel in order to avoid permeation of water from the outside into the storage panel.

The dried is, for example, as shown in FIGS. 13 to 16, encapsulated between layers of a support and a protective layer. It is preferred that the protective layer which is thick and a low in moisture permeability is used and yet a dried gas is present between layers of a stimulable layer and a protective layer to form a lower refractive index layer since both moisture resistance and sharpness are excellent.

Figure 17:
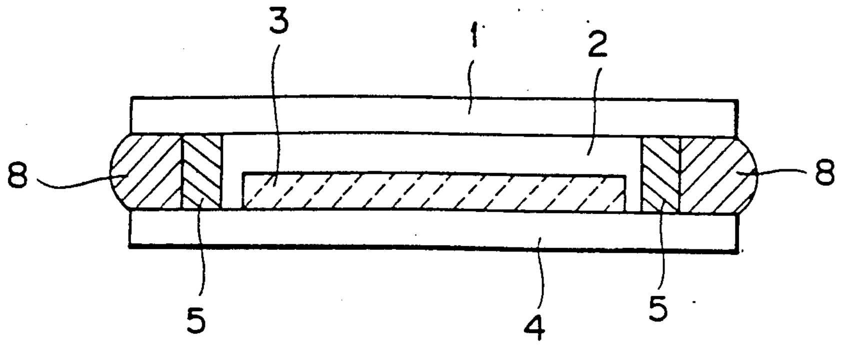

Further, it is preferred as shown in FIG. 17 that a spacer (a protective layer supporting member 5) be provided.

In the storage panel of the present invention, in order to encapsulate a dried gas, for example, the following method can be employed.

After a storage panel comprising a support, a stimulable layer and a protective layer is formed according to any of the above-mentioned methods, when sealing its edges with a sealing medium, one vent hole (notch) is provided at the portion to be sealed and after sucking to create a vaccum, the inner portion is leaked with the above-mentioned dried gas and the vent hole is sealed. It is preferred that the suction to create vacuum be carried out under heat since elimination of water can be carried out effectively. Also, by connecting the notch portion and a vacuum line directly and then sealing by cutting the connecting line after replacement with the dried gas, permeation of water can be prevented more effectively.

Another method which can be employed includes that the method in which two or more notches are formed at the sealing portion, a dried gas is inlet from one notch portion to pass through the dried gas in the storage panel, replacement is effected with the dried gas, and then the notches are sealed. At this time, it is preferred that the above procedure also be carried out under heat since permeation of water can be prevented more effectively.

If a dried gas in encapsulated in the storage panel, the inside of the storage panel is maintained at the dried state and the pressure therein is maintained higher than the external pressure so that water hardly permeates from a protective layer or a sealed portion of edges.

In the radiation image storage panel of the present invention, in the case that edge portions are sealed with a sealing medium, it is more effective to provide a hygroscopic agent between layers of a support and a protective layer.

Figure 18:
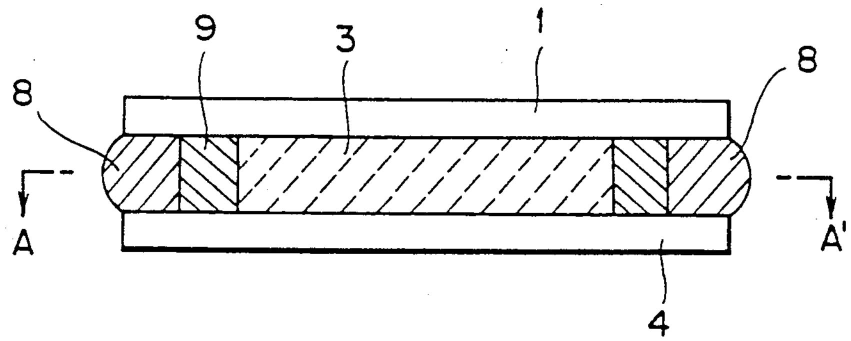
Figure 19:
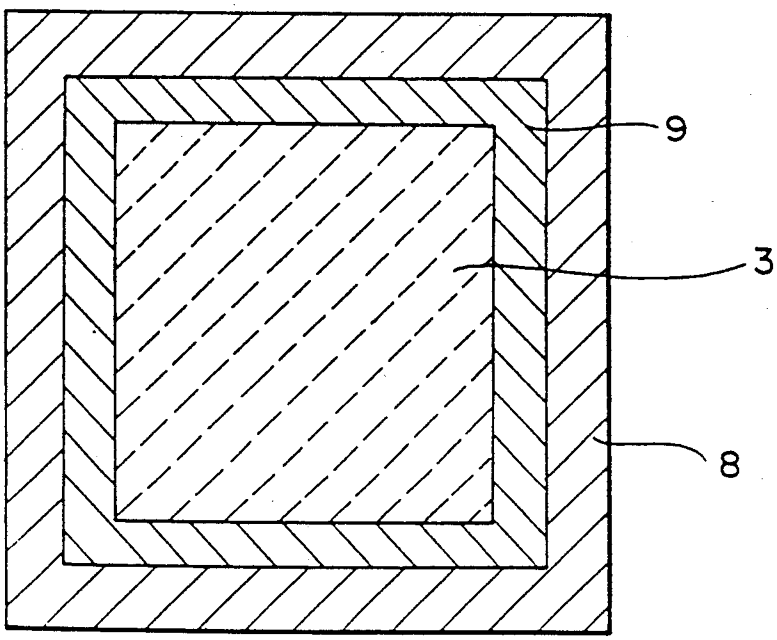

FIG. 18 shows one example of the storage panel of the present invention schematically, and 1 is a protective layer, 3 is a stimulable layer, 4 is a support, 8 is a sealing medium and 9 is a hygroscopic agent, As the hygroscopic agent to be used in the present invention, there may be mentioned silica gel, $CaCl_2$, LiCl, etc., or an organic polymer compound having high hygroscopicity such as polyvinyl alcohol, ethylene-vinyl alcohol copolymer, etc., They may be used as they are or may be used after molding, or else they may be used after being added into a resin.

The hygroscopic agent may be employed in an amount such that water hygroscopic content becomes 0.1 to 50 mg per one gram of a stimulable phosphor.

The hygroscopic agent may be present at any position so long as it exists between layers of a support and a protective layer, excluding the case in which it exists between the stimulable layer which is in the region using an image by converting an accumulated X-ray energy and a protective layer. The hygroscopic agent may be present continuously or discontinuously. The preferred state is that in which the hygroscopic agent is present between a support and a protective layer and is filled between the outside portion of a stimulable layer and a sealing medium without gaps.

Figure 20:
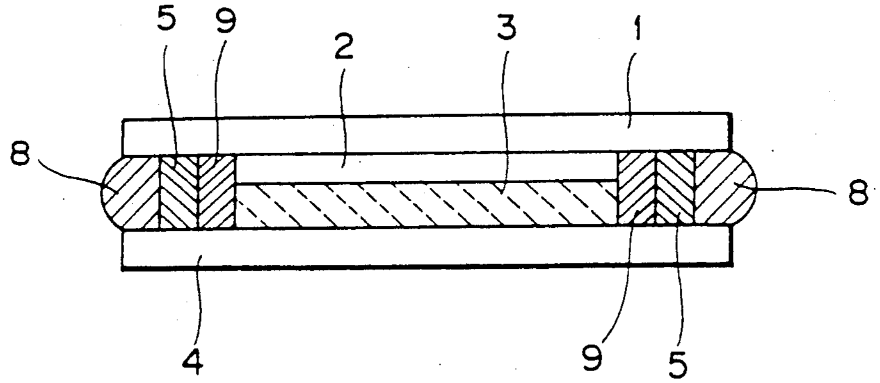

When a lower refactive index layer comprising a gaseous layer is provided, as shown in FIG. 20, a spacer 6 may be provided between a protective layer and a support in order to retain a space between a stimulable phosphor layer and a protective layer.

Since a hygroscopic agent is incorporated in this radiation image storage panel, water permeated from a sealing portion of edge portions of the storage panel can be absorbed and eliminated, and also water contained in the stimulable layer at the time of preparation of the storage panel can be absorbed and eliminated. Thus, initial characteristics can be improved without deterioration of the stimulable layer by water.

Therefore, according to the present invention, there can be provided a storage panel which shows excellent characteristics even when it is used under sever conditions of temperature and humidity even using a stimulable phosphor which is low in humidity resistance.

The stimulable phosphors constituting the stimulable layer of the storage panel according to the present invention include phosphors which emit, after irradiation by an initial light or high energy radiation source, a stimulation (stimulating excitation) of an optical, thermal, mechanical, chemical or electrical nature in response to the irradiation dose of the initial light or high energy radiation source. For such reasons, in practical uses, stimulable phosphors which can exhibit stimulated emission at a stimulating excitation light of 500 nm or more are preferred. Such stimulable phosphors may include, for example, as disclosed in Japanese Provisional Patent Publication No. 80487/1973, those represented by $BaSO_4$:Ax; as disclosed in Japanese Provisional Patent Publication No. 80489/1973, those represented by $SrSO_4$:Ax; as disclosed in Japanese Provisional Patent Publication No. 39277/1978 those represented by $Li_2B_4O_7$:Cu,Ag, etc.; as disclosed in Japanese Provisional Patent Publication No. 47883/1979, those represented by $Li_2O$. $(B_2O_2)x$:Cu and $Li_2O$. $(B_2O_2)x$:Cu,Ag, etc.; and as disclosed in U.S. Pat. No. 3,858,527, those represented by SrS:Ce,Sm, SrS:Eu,Sm, $La_2O_2S$:Eu,Sm and (Zn,Cd)S:Mn,X.

Also, as disclosed in Japanese Provisional Patent Publication No. 12142/1980, ZnS:Cu,Pb phosphor, a barium aluminate phosphor represented by the formula: $BaO.xAl_2O_3:Eu$, and an alkaline earth metal silicate type phosphor represented by the formula: $M^{II}.xSiO_2:A$ may be mentioned. Further, an alkaline earth fluorohalogenated phosphor represented by the formula:

$$(Ba_{1-x-y}Mg_xCa_y)FX:Eu^{2+}$$

as disclosed in Japanese Provisional Patent Publication No. 12143/1980; a phosphor represented by the formula:

$$LnOX:xA$$

as disclosed in Japanese Provisional Patent Publication No. 12144/1980; a phosphor represented by the formula:

$$(Ba_{1-x}M^{II}_x)FX:yA$$

as disclosed in Japanese Provisional Patent Publication No. 12145/1980; a phosphor represented by the formula:

$$BaFX:xCe,yA$$

as disclosed in Japanese Provisional Patent Publication No. 84389/1980; a rare earth element activated divalent metal fluorohalide phosphor represented by the formula:

$$M^{II}FX.xA:yLn$$

as disclosed in Japanese Provisional Patent Publication No. 160078/1980; phosphors represented by the formulae: ZnS:A, CdS:A, (Zn,Cd)S:A, ZnS:A,X and CdS:A,X; a phosphor represented by either one of the formula:

$$xM_3(PO_4)_2.NX_2:yA,$$

$$M_3(PO_4)_2:yA$$

as disclosed in Japanese Provisional Patent Publication No. 38278/1984; a phosphor represented by either one of the formula:

$$nReX_3.mAX_2.xEu$$

$nReX_3.mAX_2.xEu,ySm$ as disclosed in Japanese Provisional Patent Publication No. 155487/1984; an alkali halide phosphor represented by the formula:

$M^IX.aM^{II}X'_2.bM^{III}X''_3:cA$ as disclosed in Japanese Provisional Patent Publication No. 72087/1986; and a bismuth activated alkali halide phosphor represented by the formula:

$M^IX:xBi$ as disclosed in Japanese Provisional Patent Publication No. 228400/1986 may be mentioned. Particularly, the alikali halide phosphors are preferred since a stimulable layer is easily formed by methods such as vapor evaporation, sputtering, etc.

However, the stimulable phosphor to be used in the radiation image storage panel of the present invention is not limited to those described above, but any phosphor which can exhibit stimulated fluorescence when irradiated with a stimulating excitation light after irradiation of radiation may be useful. Since the storage panel of the present invention can prevent permeation of water from the outside, an alkaline earth fluorohalide phosphor, or an alkali halide phosphor, for example, which are normally easily deteriorated by water may be used as the phosphor so that the effect of the present invention is great.

The stimulable layer of the storage panel according to the present invention may have a group of stimulable phosphor layers containing one or more stimulable phosphor layers comprising at least one of the stimulable phosphors as mentioned above. Also, the stimulable phosphor to be contained in respective stimulable phosphor layers may be either identical or different.

As the method for forming the stimulable layer, the coating method as disclosed in Japanese Provisional Patent Publication No. 12600/1981 may be applied, or the gas phase build-up method such as the vapor evaporation method may be applied.

The stimulable layer formed by the gas phase build-up method becomes high in packing density and also high in radiation sensitivity as compared with the stimulable layer formed by the coating method.

The thickness of the stimulable phosphor layer in the storage panel, which may differ depending on the sensitivity of the panel to radiation, the kind of the stimulable phosphor, etc., may preferably be within the range of from 10 to 1000 μm, more preferably from 30 to 800 μm when no binder is used, and may preferably be within the range of from 20 to 1000 μm, more preferably from 50 to 500 μm when a binder is used.

As the support to be used in the present invention, various kinds of polymer materials, glass, ceramic, metal, etc. may be mentioned.

Acceptable polymer materials include, for example, a film such as cellulose acetate, polyester, polyethylene terephthalate, polyamide, polyimide, triacetate, polycarbonate, etc. Acceptable metals include a metal sheet or a metal plate such as aluminum, iron, copper, chromium, etc., or a metal sheet or a metal plate having a coating layer of an oxide of the metal. Acceptable glasses include a chemically reinforced glass or a crystallized glass. Also, acceptable ceramics include a sintered plate of alumina and zirconia may be mentioned.

Also, the layer thickness of these supports may vary depending on the material quality or the like of the supports to be used, but may generally range from 80 μm to 5 mm, more preferably from 200 μm to 3 mm from the viewpoint of handling. The layer thickness of the support is preferably a thickness at which its moisture permeability is 10 $g/m^2 \cdot 24$ hr or less from the viewpoint of moistureproof property, more preferably a thickness at which the moisture permeability is 5 $g/m^2 \cdot 24$ hr or less.

The surface of these supports may be smooth, or may be a matted surface in order to improve adhesiveness with a stimulable layer. Also, the surface of these supports may be a concave-convex surface, or may be a surface structure in which separate and independent fine tile plates are closely disposed thereon.

Further, to improve the adhesion between the support and the phosphor layer, these supports may be provided with a subbing layer on the surface on which the phosphor layer is provided, or if necessary, a light reflective layer or a light absorbing layer, etc. may be provided.

As disclosed in Japanese Provisional Patent Publication No. 220492/1986, a radiation image storage panel original body comprising a support and a stimulable layer is contained in a protective bag comprising a polymer film and side edge portions may be sealed. In this case, a lower refractive index layer may previously be formed on the surface of the stimulable layer or may be formed on the surface opposite to the stimulable layer in the protective bag. Or a lower refractive index layer may be formed by providing a gaseous layer of a vacuum layer between the protective layer and the stimulable layer.

As the sealing method of the protective bag, the heat sealing method, the high frequency sealing method, the ultrasonic sealing method, etc. are preferred but it may be employed the method in which after coating an adhesive agent, contact bonding or thermal contact bonding is carried out.

In the storage panel of the present invention, the protective layer may also have a role of support. In this case, the support mentioned in this invention does not necessarily have to have the function of supporting a stimulable layer.

Figure 21:
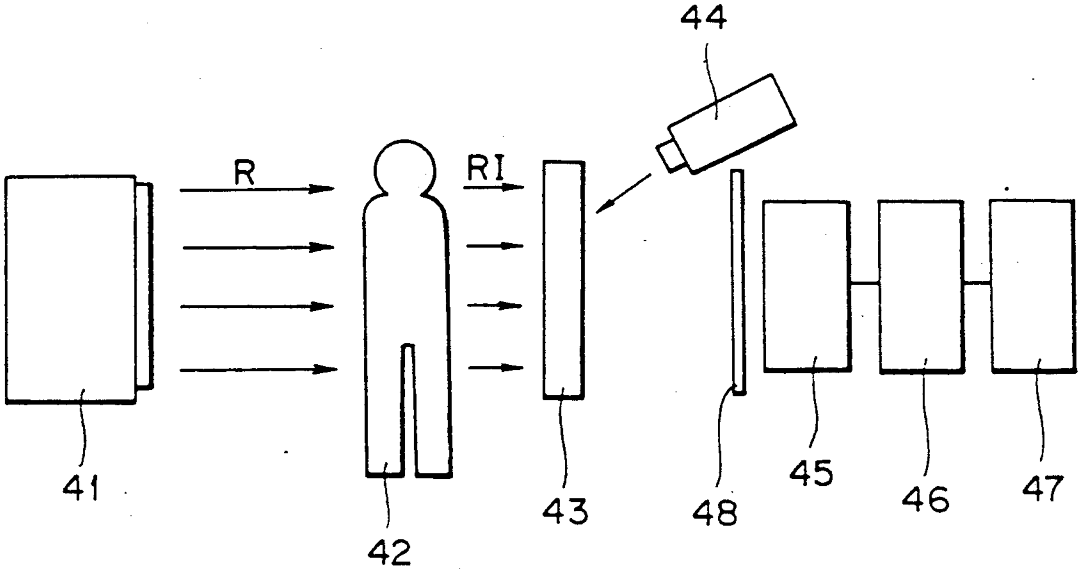
FIG. 21 is a view explaining a radiation image storage method using a storage panel; wherein 1 is a protective layer (1*a* and 1*b*), 2 is a lower refractive index layer (2*a* and 2*b* except for 2*b* in FIG. 3), 3 is a stimulable layer, 4 is a support, 5 is a protective layer supporting member, 51 is a non-hygroscopic supporting member, 52 is a hygroscopic supporting member, 6 is a spacer, 7*a* is a first moistureproof member, 7*b* is a second moistureproof member, 8, 81 and 82 are sealing members, 9 is an adsorbing agent, 10 is an elastic sealing medium, 10*a* is an elastic sealing medium having a low modulus of elasticity and 10*b* is an elastic sealing agent having a high modulus of elasticity.

The storage panel of the present invention is employed for the radiation image storage method as schematically illustrated in FIG. 21.

In FIG. 21, the numeral 41 denotes a radiation generator, 42 is a subject, 43 is a storage panel according to the present invention, 44 is a stimulating excitation light source, 45 is a photoelectric transducer to detect stimulated emission radiated from the panel, 46 is a unit to reproduce as an image the signals detected by 45, 47 is a unit to display a reproduced image, and 48 is a filter to separate the stimulating excitation light and stimulated emission, passing only the stimulated emission. Incidentally, 45 and thereafter are not limited by the above so long as they can reproduce optical information from 43 as an image in any form.

As shown in FIG. 21, the radiation from the radiation generator 41 is made incident on the panel of the present invention through the subject 42. This radiation thus made incident is absorbed in the phosphor layer of the panel 43, where its energy is accumulated and an accumulated image of the radiation-transmitted image is formed.

Next, this accumulated image is excited by the stimulating excitation light from the stimulating excitation light source 44 and emitted as a stimulated emission.

The strength of the stimulated emission thus radiated is proportional to the amount of accumulated radiation energy. Accordingly, this light signal may be subjected to photoelectrical conversion by means of the photoelectric transducer 45 as exemplified by a photomultiplier tube, reproduced as an image by the image-reproducing unit 46, and displayed by the image display unit 47, so that the radiation-transmitted image of the subject can be observed.

EXAMPLES

The present invention will be explained below by referring to Examples.

Example 1

On a crystallized glass support having a thickness of 500 μm, an alkali halide phosphor (RbBr:0.0006T1) was vapor evaporated with a thickness of 300 μm using a vapor evaporation device.

Subsequently, on the above stimulable layer, a protective layer having a thickness of 550 μm and a lower refractive index layer were provided by the combination as shown in Table 5, provided that numerals in the parentheses in the table show the refractive index.

TABLE 5

| Layer Sample | Protective layer | Lower refractive index layer |
|---|---|---|
| 1 | Glass (1.52) 550 μm | $CaF_2$ (1.25) 0.1 μm |
| 2 | Glass (1.52) 550 μm | Air (1.0) 200 μm |
| 3 | Glass (1.52) 550 μm | Air (1.0) 10 μm |
| 4 | PET (1.54) 550 μm | Air (1.0) 10 μm |

Example 2

On a crystallized glass support having a thickness of 500 μm, an alkali halide phosphor (RbBr:0.0006T1) was vapor evaporated with a thickness of 300 μm using a vapor evaporation device.

Subsequently, on the above stimulable layer, a protective layer having a thickness of 550 μm, a lower refractive index layer and a higher refractive index layer were provided by the combination as shown in Table 6, provided that numerals in the parentheses in the table show the refractive index.

TABLE 6

| Layer Sample | Protective layer | Lower refractive index layer | Higher refractive index layer |
|---|---|---|---|
| 5 | Glass (1.52) 550 μm | $CaF_2$ (1.25) 0.1 μm | $ZrO_2$ (2.1) 0.1 μm |
| 6 | Glass (1.52) 550 μm | Air (1.0) 200 μm | PET (1.54) 10 μm |
| 7 | Glass (1.52) 550 μm | Air (1.0) 10 μm | PET (1.54) 10 μm |
| 8 | PET (1.54) 550 μm | Air (1.0) 10 μm | PET (1.54) 10 μm |

After formation of the stimulable layer regarding Samples Nos. 2 to 4, and after formation of the lower refractive index layer regarding Samples Nos. 6 to 8, a glass sheet having the width of 5 mm was adhered and formed on the support so as to surround the above stimulable layers, respectively. This glass sheet layer was selected such a material that the thickness of the lower refractive index layer becomes ones as shown in Tables 5 and 6. After vacuum drying, other surfaces of the above glass sheet and the protective layers shown in Table 5 were provided to Samples Nos. 2 to 4, respectively, in the same manner as mentioned above.

Comparative example 1

Also, as the comparative example, using the same support and the stimulable layer, comparative samples A and B were prepared by adhering protective layers to the stimulable layer with a polyurethane type adhesive agent as shown in Table 7 without providing a lower refractive index layer and a higher refractive index layer.

TABLE 7

| A | B |
|---|---|
| PET 10 μm | Glass 550 μm |

In each of samples, vacuum drying was carried out under the conditions of 80° C. and $10^{-3}$ Torr for one hour.

Regarding the above Samples, moistureproof properties and sharpness by MTF were checked, respectively Samples Nos. 1, 2, 3, 5, 6 and 7 and Comparative sample B showed good moistureproof properties, respectively, and they caused no lowering in radiation sensitivity even when they had been allowed to stand under the conditions of temperature of 40° C. and humidity of 90% for 48 hours. Also, deterioration in accumulated energy until accepting stimulable light irradiation is extremely small.

In Samples Nos. 4 and 8, slight deteriorations have been admitted but they are practically acceptable. In Sample A, deterioration in accumulated energy until accepting stimulable light irradiation is extremely large so that it becomes a serial problem for practical use.

In Table 8, MTF values at spatial frequencies of 1 lp/mm and 2 lp/mm of each sample are shown. While Comparative Sample B remarkably lowered in sharpness by providing the glass protective layer having 550 μm thickness, Samples 1 to 8 show little lowering in sharpness even though they have the thick protective layer of 550 μm which is the same with the comparative Sample B.

Particularly, in Samples Nos. 2 to 4 and 6 to 8, sharpnesses of which are the same with that of Comparative Sample A which has the thin protective layer and shows high sharpness, whereby they can endure clinical uses.

TABLE 8

| Sample | MTF (%) 1 lp/mm | 2 lp/mm |
|---|---|---|
| 1 | 57 | 28 |
| 2 | 62 | 34 |
| 3 | 66 | 36 |
| 4 | 64 | 38 |
| 5 | 59 | 29 |
| 6 | 64 | 34 |
| 7 | 67 | 37 |
| 8 | 65 | 38 |
| A | 64 | 35 |
| B | 41 | 20 |

Example 3

On a crystallized glass support having a thickness of 500 μm, an alkali halide phosphor (RbBr:0.0006Tl) was vapor evaporated with a thickness of 300 μm using a vapor evaporation device.

Subsequently, on the above stimulable layer a protective layer and a lower refractive index layer were provided by the combination as shown in Table 9, provided that numerals in the parentheses in the table show the refractive index.

The protective layers in Table 9 had been formed by adhering two protective layers having different absorption permeability with an adhesive agent, respectively.

Eval EFF in Table 9 is the tradename of an ethylene-vinyl alcohol copolymer (produced by Kuraray Co.) and the ratio of copolymerized ethylene is 32 mole %.

Comparative example 2

Also, as the comparative example, using the same support and the stimulable layer, comparative samples A, B and C were prepared by adhearing protective layers to the stimulable layer with a polyurethane type adhesive agent as shown in Table 10 without providing a lower refractive index layer and a higher refractive index layer.

TABLE 9

| Layer Sample | Protective layer | Lower refractive index layer |
|---|---|---|
| 9 | Glass (1.52) 550 μm + Eval EFF (1.50) 15 μm | Air (1.0) |
| 10 | PET (1.54) 550 μm + Eval EFF (1.50) 15 μm | Air (1.0) |
| 11 | Polyethylene (1.55) 80 μm + Eval EFF (1.50) 15 μm | Vacuum (1.0) |
| 12 | Polyethylene (1.55) 80 μm + Stretched Nylon (1.50) 15 μm | Vacuum (1.0) |

TABLE 10

| Layer Sample | Protective layer | Lower refractive index layer |
|---|---|---|
| A | PET (1.54) 10 μm | None |
| B | Glass (1.52) 550 μm | None |
| C | Polyethylene (1.55) 80 μm | None |

In each of samples, after the stimulable layer vacuum evaporated on the support was vacuum dried under the conditions of 80° C. and $10^{-3}$ Torr for one hour, edge portions thereof were sealed. In Samples Nos. 9 and 10, as shown in FIG. 4, Eval EFF was provided on the stimulable layer side, an air layer having 100 μm was provided between the stimulable layer and the protective layer by providing a glass spacer having a thickness of 400 μm, and edge portions of the protective layer and he support were sealed with an epoxy resin type adhesive agent.

In Samples Nos. 11 and 12, the support on which the stimulable layer had been vacuum evaporated was contained in a protective bag with polyethylene on the outside, and vacuum sealed.

Comparative example 3

Comparative samples A, B and C were prepared by adhering the protective layer to the stimulable layer and edge portions of the protective layer and the support were sealed with an epoxy resin type adhesive agent.

Regarding the above Samples, moistureproof property and sharpness by MTF were checked, respectively.

Samples Nos. 9, 10, 11 and 12 and Comparative sample B showed good moisture resistances, respectively, and they caused no lowering in radiation sensitivity even when they had been allowed to stand under the conditions of the temperature of 40° C. and the humidity of 90% for 48 hours. Also, deterioration in accumulated energy until accepting stimulable light irradiation is extremely small.

In Comparative Samples A and C, deterioration in accumulated energy until accepting stimulable light irradiation is extremely large so that it becomes a serial problem for practical use.

In Table 11, MTF values at spatial frequencies of 1 lp/mm and 2 lp/mm of each sample are shown. While Comparative Samples B and C remarkably lowered in sharpness by providing the relatively thick protective layer, Samples 9 to 12 show little lowering in sharpness even though they have the thick protective layer.

Samples Nos. 9 to 12 show sharpnesses which are the same with or superior to that of Comparative Sample A which had the thin protective layer and shows high sharpness. These samples further show excellent humidity resistance.

TABLE 11

| Sample | MTF (%) 1 lp/mm | 2 lp/mm |
|---|---|---|
| 9 | 66 | 36 |
| 10 | 64 | 37 |
| 11 | 70 | 38 |
| 12 | 69 | 38 |
| A | 64 | 35 |
| B | 41 | 20 |
| C | 46 | 37 |

Example 4

On a crystallized glass support having a thickness of 500 μm, an alkali halide phosphor (RbBr:0.0006Tl) was vapor evaporated with a thickness of 300 μm using a vapor evaporation device.

Subsequently, on the above stimulable layer, a protective layer having a thickness of 550 μm, a lower refractive index layer and a higher refractive index layer were provided by the combination as shown in Table 12, provided that numerals in the parentheses in the table show the refractive index.

TABLE 12

| Layer Sample | Protective layer | Lower refractive index layer | Higher refractive index layer |
|---|---|---|---|
| 13 | Glass (1.52) 550 μm | Air (1.0) 75 μm | Eval EFF (1.50) 15 μm |
| 14 | Glass (1.52) 550 μm | Air (1.0) 75 μm | PET (1.54) 15 μm |
| 15 | PRT (1.54) 550 μm | Air (1.0) 75 μm | Eval EFF (1.50) 15 μm |
| 16 | PET (1.54) 550 μm | Air (1.0) 75 μm | PET (1.54) 15 μm |

Eval EFF in Table 12 is the tradename of an ethylene-vinyl alcohol copolymer (produced by Kuraray Co.) and the ratio of copolymerized ethylene is 32 mole%. The equilibrium moisture permeability of the Eval EFF at the temperature of 25° C. and the relative humidity of 65% is 3.9% and that of PET is 0.2%.

Comparative example 4

As the Comparative Samples, Comparative Samples A and B used in Comparative example 1 were used.

In each of samples, after the stimulable layer vacuum evaporated on the support was vacuum dried under the conditions of 80° C. and $10^{-3}$ Torr for one hour, edge portions thereof were sealed with an epoxy resin type adhesive agent.

Samples Nos. 13 to 16 were, as shown in FIG. 4, made with the Eval EFF on the stimulable layer side, and an air layer having 75 μm was provided between the higher refractive index layer and the protective layer by providing a glass spacer having a thickness of 400 μm.

Regarding the above Samples, moistureproof properties and sharpness by MTF were checked, respectively.

Samples Nos. 13, 14 and 15 and Comparative sample B show good moistureproof properties, respectively, and they cause no lowering in radiation sensitivity even when they had been allowed to stand under the conditions of temperature of 40° C. and humidity of 90% for 48 hours. Also, deterioration in accumulated energy until accepting stimulable light irradiation is extremely small. Further, in Sample No. 13, radiation sensitivity thereof is higher about 1.3-fold as compared with other Samples.

In Sample 16, slight deteriorations have been admitted but they are practically acceptable. In Comparative Sample A, deterioration in accumulated energy until accepting stimulable light irradiation is extremely large so that it becomes a serial problem for practical use.

In Table 13, MTF values at spatial frequencies of 1 lp/mm and 2 lp/mm of each sample are shown. While Comparative Sample B remarkably lowered in sharpness by providing the relatively thick protective layer having a thickness of 550 μm, Samples No. 13 to 16 show little lowering in sharpness even though they have the thick protective layer of 550 μm which is the same with the Comparative Sample B.

In samples Nos. 13 to 16, sharpnesses are the same as or superior to that of Comparative Sample A which has the thin protective layer and shows high sharpness, and clinical use can be endured. Also, Sample No. 13 shows particularly excellent characteristics since it shows high radiation sensitivity as compared with others.

TABLE 13

| | MTF (%) | |
|---|---|---|
| Sample | 1 lp/mm | 2 lp/mm |
| 13 | 66 | 39 |
| 14 | 66 | 38 |
| 15 | 67 | 37 |
| 16 | 65 | 38 |
| A | 65 | 37 |
| B | 40 | 21 |

Examples 5 to 7

On a crystallized glass support having a thickness of 500 μm, an alkali halide phosphor (RbBr:0.0006Tl) was vapor evaporated with a thickness of 300 μm using a vapor evaporation device to form a stimulable layer. Subsequently, on the support, a glass sheet having a width of 5 mm was adhered with an epoxy resin type adhesive agent so as to surround the above stimulable layer. This glass sheet was selected so as to become the thickness of the lower refractive index layer shown in Table 14. Then, vacuum drying was carried out under the conditions of 80° C. and $10^{-3}$ Torr for one hour. Next, the other surface of the above glass sheet and the protective layer shown in Table 14 were adhered in the same manner as mentioned above. By effecting the above series of steps in the ambient atmosphere, the lower refractive index layer was made an air layer to give the storage panel of the present invention. In Table 14, numerals in the parentheses in the table show the refractive index.

Comparative example 5

Also, as the comparative samples, using the same support and the stimulable layer as in the Examples, two kinds of protective layers (PET and glass) were adhered to the stimulable layer with a polyurethane type adhesive agent without providing a lower refractive index layer. Edge portions of the stimulable layer were sealed with a glass sheet having a width of 5 mm and an epoxy resin type adhesive agent in the same manner as in Examples 5 to 7. The samples thus formed are called Comparative Samples D and E. Here, the Comparative Sample D was prepared to improve mainly sharpness (that in which the protective layer was PET) and the Comparative Sample E was prepared to improve mainly moistureproof property (that in which the protective layer was glass).

TABLE 14

| Layer Sample | Protective layer | Lower refractive index layer |
|---|---|---|
| Example 5 | Glass (1.52) 550 μm | Air (1.0) 400 μm |
| Example 6 | Glass (1.52) 550 μm | Air (1.0) <10 μm |
| Example 7 | PET (1.54) 1.5 mm | Air (1.0) 400 μm |
| Comparative Sample D | PET (1.54) 10 μm | None |
| Comparative Sample E | Glass (1.52) 550 μm | None |

Examples 8 to 13

The storage panels of the present invention were prepared in the same manner as in Examples 5 to 7 except for using those as shown in Table 15 as the protective layer and the

TABLE 15

| Layer Sample | Protective layer | Lower refractive index layer | Protective layer supporting member |
|---|---|---|---|
| Example 8 | Glass (1.52) 1 mm | Air (1.0) 1 mm | Glass width 5 mm |
| Example 9 | OPP 1.5 mm | Air (1.0) 2 mm | Glass width 3 mm |
| Example 10 | Glass 1 mm | Air (1.0) 2 mm | Polyethylene width 8 mm |
| Example 11 | Polyethylene 2.5 mm | Air (1.0) 1 mm | Acryl resin width 10 mm |
| Example 12 | Acryl resin 3.5 mm | Air (1.0) 1 mm | Acryl resin width 10 mm |
| Example 13 | Glass (1.52) 1 mm | Nitrogen (1.0) 1 mm | Glass width 5 mm |

Examples 14 and 15

The storage panels of the present invention were prepared in the same manner as in Example 13 except for using a phenol resin type adhesive agent (Example 14) and a silicone resin type adhesive agent (Example 15) as an adhesive agent, respectively.

Examples 16 and 17

8 parts by weight of BaFBr:Eu stimulable phosphor and 1 part by weight of polyvinyl butyral resin were mixed and dispersed by using 5 parts by weight of a solvent (cyclohexanone) to prepare a coating solution for forming a stimulable layer. Subsequently, the coating solution was uniformly coated on a levelly placed crystallized glass having a thickness of 500 μm and was allowed to dry naturally to form a stimulable layer having a thickness of about 300 μm. Thereafter, on the support, glass sheet having a width of 5 mm was adhered with an epoxy resin type adhesive agent so as to surround the above stimulable layer. This glass sheet was selected so as to become the thickness of the lower refractive index layer shown in Table 16. Then, vacuum drying was carried out under the conditions of at 80° C. and $10^{-3}$ Torr for one hour. Next, other surface of the above glass sheet and the protective layer shown in Table 16 were adhered in the same manner as mentioned above. By effecting the above series of steps in the ambient atmosphere, the lower refractive index layer was made an air layer to give the storage panel of the present invention.

Comparative example 6

Also, as Comparative Sample F, using the same support and the stimulable layer as in the above Examples, PET was adhered to the stimulable layer with a polyurethane type adhesive agent without forming a lower refractive index layer. Here, the Comparative Sample F was prepared to improve mainly sharpness.

TABLE 16

| Layer Sample | Protective layer | Lower refractive index layer |
|---|---|---|
| Example 16 | Glass (1.52) 550 μm | Air (1.0) 800 μm |
| Example 17 | PET (1.54) 250 μm | Air (1.0) 800 μm |
| Comparative Sample F | PET (1.54) 10 μm | None |

Next, regarding each storage panel of the above Examples and Comparative examples, moistureproof property and sharpness were evaluated. The results are shown in Table 17.

The moistureproof property was evaluated from sensitivity lowering rate and fading lowering rate after forced lowering in which the storage panel was allowed to stand under the conditions of temperature of 40° C. and relative humidity of 95% for 60 days. Test methods are as follows:

Sensitivity lowerinq rate P

After 10 mR of X-ray having a tube voltage of 80 kVp was irradiated to a storage panel before a forced deterioration test, and after interval of 5 seconds, stimulating with semiconductor laser light (780 nm, 20 mW) and stimulated emission was photoelectrically converted by a photomultiplier whereby sensitivity $S_{st}$ (5 sec) of the storage panel before the deterioration test was measured from the degree of the obtained electric signal. Also, in the same manner as mentioned above, sensitivity $S_{60}$ (5 sec) of the storage panel after the test was measured.

From obtained each sensitivity, the sensitivity lowering rate was measured by the following equation:

$$P(\%) = 1 - \frac{S_{60\,(5\,sec)}}{S_{st\,(5\,sec)}} \times 100$$

Fading loweringq rate Q

Fading : FST (damping factor of an accumulated energy between irradiation of X-ray and reading a signal with a laser beam) of a storage panel before the forced deterioration test was measured by the following method. First, after 10 mR of X-ray having a tube voltage of 80 kVp was irradiated to a storage panel, and after interval of 5 seconds, stimulating with semiconductor laser light (780 nm, 20 mW) and stimulated emission was photoelectrically converted by a photomultiplier whereby a sensitivity $S_{st}$ (5 sec) was measured from the degree of the obtained electric signal. Also, in the same manner as mentioned above, a sensitivity $S_{st}$ (120 sec) was measured from the electric signal obtained by simulating with an interval of 120 seconds after X-ray irradiation.

From obtained each sensitivity, fading $F_{st}$ before the deterioration test was measured by the following equation:

$$F_{ST} = 1 - \frac{S_{st\,(120\,sec)}}{S_{st\,(5\,sec)}}$$

In the same manner as mentioned above, fading $F_{60}$ of the storage panel after a forced deterioration test was measured by the following equation:

$$F_{60} = 1 - \frac{S_{60\,(120\,sec)}}{S_{60\,(5\,sec)}}$$

From the $F_{ST}$ and the $F_{60}$ thus obtained, the fading lowering rate was calculated from the following equation:

$$Q(\%) = \frac{F_{60} - F_{ST}}{1 - F_{ST}} \times 100$$

Sharpness

Sharpness was evaluated by measuring the modulation transfer function (MTF) with spatial frequencies of 1 lp/mm and 2 lp/mm with respect to the storage panel before the forced deterioration test.

TABLE 17

| | Sensitivity lowering rate (%) | Fading lowering rate (%) | MTF 1 lp/mm | MTF 2 lp/mm |
|---|---|---|---|---|
| Example 5 | <2 | <2 | 70 | 38 |
| Example 6 | <2 | <2 | 71 | 36 |
| Example 7 | 18 | 34 | 70 | 37 |
| Example 8 | <2 | <2 | 70 | 37 |
| Example 9 | 4.8 | 9.8 | 70 | 38 |
| Example 10 | <2 | 2.1 | 71 | 38 |
| Example 11 | 3.4 | 7.0 | 70 | 38 |
| Example 12 | 11 | 25 | 71 | 37 |
| Example | <2 | <2 | 70 | 38 |

TABLE 17-continued

| | Sensitivity lowering rate (%) | Fading lowering rate (%) | MTF 1 lp/mm | MTF 2 lp/mm |
|---|---|---|---|---|
| Example 13 | <2 | 2.5 | 71 | 38 |
| Example 14 | <2 | 2.8 | 70 | 37 |
| Example 15 | <2 | <2 | 65 | 34 |
| Example 16 | 5.5 | 8.3 | 64 | 33 |
| Example 17 | | | | |
| Comparative D | 94 | 99 | 76 | 36 |
| Comparative E | <2 | <2 | 42 | 20 |
| Comparative F | 38 | 46 | 64 | 35 |

While the storage panels of Examples 5 to 15 in Table 17 have thick protective layer, they show little lowering in sharpness and endure clinical use. To the contrary, the storage panel of Comparative Sample E which had glass of a thickness of 550 μm adhered to the stimulable layer was remarkable lowered in sharpness. Regarding lowering in the fading lowering rate, it is small in the storage panels of the examples and these storage panels have sufficient humidity resistance. On the other hand, since the storage panel of Comparative Sample S had used a thin protective layer, deterioration due to water was remarkable whereby it could not endure clinical use.

The storage panels of Examples 16 and 17 in Table 17 also show excellent sharpness. Also, sensitivity lowering rate and fading lowering rate due to the deterioration test thereof are less as compared with that of the storage panel of Comparative Sample F, and these storage panels had sufficient humidity resistance.

Examples 18 to 23

On a crystallized glass support with a thickness of 500 μm, an alkali halide phosphor (RbBr:0.0006T1) was vapor evaporated with a thickness of 300 μm using a vapor evaporation device to form a stimulable layer. Subsequently, a first moistureproof member shown in Table 18 and having the same thickness with that of the stimulable layer was adhered with an epoxy resin type adhesive agent. Thereafter, in the same manner as mentioned above, a protective layer was adhered to the above first moistureproof member. Next, a second moistureproof member shown in Table 18 was filled to prepare the storage panel of the present invention.

Next, with respect to the storage panels, moistureproof property and shapness were evaluated. The result of the moistureproof property tests are shown in Table 18.

The moistureproof property was evaluated from sensitivity lowering rate and fading lowering rate after the storage panel was subjected to forced deterioration by allowing it stand at the conditions of temperature of 40° C. and relative humidity of 97% for 80 days. The test methods are as mentioned above.

Example 24

The storage panel was prepared in the same manner as in Example 18 except for adhering the protective layer and the stimulable layer with a polyurethane type adhesive agent. With respect to this storage panel, the same tests were carried out as in Examples 18 to 23. The results are shown in Table 18.

Example 25

The storage panel was prepared in the same manner as in Example 18 except for forming the stimulable layer by the method as shown below.

The method for forming the stimulable layer is as follows: 8 parts by weight of BaFBr:Eu phosphor having an average particle size of 2 μm and 1 part by weight of polyvinyl butyral (binder) were mixed and dispersed by using 5 parts by weight of a solvent (cyclohexanone) to prepare a coating solution. Subsequently, the coating solution was uniformly coated on a levelly placed support which is the same as in Example 18 and was allowed to stand day and night to form a stimulable layer.

With respect to the prepared storage panel, the same tests were carried out as in Examples 18 to 23. The results are shown in Table 18.

Example 26

The storage panel was prepared in the same manner as in Example 19 except that the thickness of the first moistureproof member was made thicker than the stimulable layer as shown in Table 18. With respect to this storage panel, the same tests were carried out as in Examples 18 to 23. The results are shown in Table 18.

Example 27

The storage panel was prepared in the same manner as in Example 23 except that the thickness of the first moistureproof member was made thicker than the stimulable layer as shown in Table 18. With respect to this storage panel, the same tests were carried out as in Examples 18 to 23. The results are shown in Table 18.

Comparative example 7

The storage panels G and H were prepared in the same manner as in Examples 17 to 23 except for using only a second moistureproof member as the moistureproof member. With respect to these storage panels, the same tests were carried out as in Examples 18 to 23. The results are shown in Table 18.

Comparative example 8

The storage panel was prepared in the same manner as in Examples 17 to 23 except that RbBr:Tl was used as the phosphor, the stimulable layer was formed by the coating method and polyethylene terephthalate having a thickness of 10 μm was used as the protective layer. With respect to these storage panels, the same tests were carried out as in Examples 18 to 23. The results are shown in Table 18.

TABLE 18

| | Protective layer | First moistureproof member | Second moisture-proof member | Sensitivity lowering rate (%), after 80 days | Fading lowering rate (%), after 80 days |
|---|---|---|---|---|---|
| Example 18 | Chemically reinforced glass, 200 μm thickness | Glass, 300 μm thickness, 5 mm width | Epoxy resin 5 mm width | <2 | <2 |
| Example 19 | Chemically reinforced glass, 1 mm thickness | Glass, 300 μm thickness, 5 mm width | Epoxy resin 5 mm width | <2 | <2 |
| Example 20 | Oriented polypropylene 2 mm thickness | Glass, 300 μm thickness, 5 mm width | Epoxy resin 7 mm width | 5.1 | 10 |
| Example 21 | Chemically reinforced glass, 1 mm thickness | Acrylic resin 300 μm thickness 8 mm width | Epoxy resin 4 mm width | 3.8 | 6.2 |
| Example 22 | Chemically reinforced glass, 1 mm thickness | Alumina, 300 μm thickness, 5 mm width | Polyvinyl chloride 7 mm width | <2 | <2 |
| Example 23 | Chemically reinforced glass, 1 mm thickness | Polyvinyl chloride 300 μm thickness 5 mm width | Silicone resin 8 mm width | 4.2 | 7.5 |
| Example 24 | Chemically reinforced glass, 200 μm thickness | Glass, 300 μm thickness, 5 mm width | Epoxy resin 5 mm width | <2 | <2 |
| Example 25 | Chemically reinforced glass, 200 μm thickness | Glass, 300 μm thickness, 5 mm width | Epoxy resin 5 mm width | <2 | <2 |
| Example 26 | Chemically reinforced glass, 1 mm thickness | Glass, 500 μm thickness, 5 mm width | Epoxy resin 5 mm width | <2 | <2 |
| Example 27 | Chemically reinforced glass, 1 mm thickness | Polyvinyl chloride 400 μm thickness 5 mm width | Silicone resin 8 mm width | 5.1 | 8.8 |
| Comparative G | Chemically reinforced glass, 200 μm thickness | None | Epoxy resin 5 mm width | 31 | 38 |
| Comparative H | Chemically reinforced glass, 1 mm thickness | None | Silicone resin 8 mm width | 44 | 46 |
| Comparative I | Polyethylene terephthalate, 10 μm | None None | None None | 98 | 99 |

From Table 18, the storage panels of Examples 18 to 27 are little deteriorated in initial characteristics even when they are placed at a high temperature and a high pressure, thus they are excellent in durability. To the contrary, in the storage panels of Comparative Samples G, H and I, the phosphor deteriorated by permeation of water whereby their initial characteristics had remarkable deteriorated. Since the storage panel of Example 24 had used thick protective layer by adhering the stimulable layer and the protective layer with an adhesive agent, lowering in sharpness of images was observed. In the storage panels of Examples 18 to 23, while the stimulable layer and the protective layer are adjacent to each other, lowering in sharpness is not observed since an optically discontinued face is present.

Example 28

8 parts by weight of BaFBr:Eu stimulable phosphor and 1 part by weight of polyvinyl butyral resin were mixed and dispersed by using 5 parts by weight of a solvent (cyclohexanone) to prepare a coating solution for forming a stimulable layer. Subsequently, the coating solution was uniformly coated on a levelly placed crystallized glass having a thickness of 500 μm and was allowed to dry naturally to form a stimulable layer having a thickness of about 300 μm. Thereafter, the above product was contained in a bag using a PET film having a thickness of 12 μm and was vacuum laminated with a vacuum laminating machine. By effecting the above series of steps, the lower refractive index layer was made a vacuum layer to give the storage panel of the present invention.

Comparative example 9

Also, as Comparative Sample J, using the same support and the stimulable layer as in the above Examples, PET having a thickness of 10 μm was adhered to the stimulable layer with a polyurethane type adhesive agent without forming a lower refractive index layer.

TABLE 19

| Layer Sample | Protective layer | Lower refractive index layer |
|---|---|---|
| Example 28 | PET (1.54) 12 μm | Vacuum (1.0) <0.1 μm |
| Comparative Sample J | PET (1.54) 12 μm | None |

Next, regarding each storage panel of the above Example and Comparative example, moistureproof property and sharpness were evaluated. The results are shown in Table 20.

TABLE 20

| | Sensitivity lowering rate (%) | Fading lowering rate (%) | MTF 1 lp/mm | MTF 2 lp/mm |
|---|---|---|---|---|
| Example 28 | 41 | 56 | 77 | 40 |
| Comparative J | 42 | 56 | 62 | 33 |

As clearly seen from Table 20, in the storage panel of Example 28 of the present invention, lowering in sharpness caused by providing the protective layer could not be observed.

Examples 29 to 32

On a crystallized glass support with a thickness of 1 mm, an alkali halide phosphor (RbBr: 0.0006T1) was vapor deposited by a vacuum deposition device to a thickness of 300 μm to form a stimulable layer. Next, on the surface of each protective layer with the thickness and the haze ratio as shown in Table 21, $CaF_2$ (refractive index: 1.25) was vapor deposited to a thickness of 0.1 μm to provide a low refractive index layer. Then, the above support and protective layer were adhered so that each stimulable layer was registered with the low refractive index layer with an epoxy resin type adhesive to obtain a storage panel.

PET (a) is the transparent type and (b) is the commercially available wide spread type.

TABLE 21

| | Protective layer | Haze ratio (%) |
|---|---|---|
| Example 29 | Soda glass 1.1 mm | 0.1 |
| Example 30 | Borosilicate glass 500 μm | 0.6 |
| Example 31 | PET (a) 550 μm | 0.4 |
| Example 32 | PET (b) 550 μm | 2.4 |

The image storage panels obtained in these Examples were vacuum dried under the conditions of 80° C. and 10 for one hour, and then the support and the side edge portion of the glass protective layer and the peripheral portion of the protective layer supporting member were sealed with an epoxy type adhesive to provide samples. For these samples, sharpness according to MTF was evaluated. Table 22 shows MTF at space frequencies of 1 lp/mm and 2 lp/mm.

TABLE 22

| | MTF (%) | |
|---|---|---|
| | 1 lp/mm | 2 lp/mm |
| Example 29 | 60 | 28 |
| Example 30 | 57 | 28 |
| Example 31 | 59 | 29 |
| Example 32 | 52 | 25 |

As is apparent from Table 22, the storage panels of the present invention have excellent sharpness.

Examples 33 to 36

On a crystallized glass support with a thickness of 1 mm, an alkali halide phosphor (RbBr: 0.0006T1) was vapor deposited by a vapor deposition device to a thickness of 300 μm to form a stimulable layer. Next, on the support, a glass sheet with a width of 5 mm and a thickness of 1 mm was adhered with an epoxy resin type adhesive so as to surround the above stimulable layer. Then, vacuum drying was effected under the conditions of 80° C. and $10^{-3}$ torr for one hour. Next, the other surface of the above glass sheet was adhered to each protective layer having a haze ratio as shown in Table 23 in the same manner as described above. By performing a series of the steps in conventional atmosphere, storage panels of the present invention were obtained with the low refractive index layer as the air layer.

TABLE 23

| | Protective layer | Haze ratio (%) |
|---|---|---|
| Example 33 | Soda glass 1.1 mm | 0.1 |
| Example 34 | Borosilicate glass 500 μm | 0.6 |
| Example 35 | PET (b) 1.5 mm | 2.6 |
| Example 36 | OPP 1.5 mm | 0.9 |

By use of the image storage panels obtained in these Examples, MTF at the space frequencies of 1 lp/mm and 2 lp/mm was measured as in Example 28 The results are shown in Table 24.

TABLE 24

| | MTF (%) | |
|---|---|---|
| | 1 lp/mm | 2 lp/mm |
| Example 33 | 66 | 36 |
| Example 34 | 65 | 34 |
| Example 35 | 59 | 30 |
| Example 36 | 65 | 33 |

As is apparent from Table 24, the storage panels of the present invention have excellent sharpness.

We claim:

1. In a radiation image storage panel having a stimulable layer and a protective layer on a support, the improvement comprising a layer having a lower refractive index than the protective layer is provided between said stimulable phosphor layer and said protective layer, and wherein said lower refractive index layer is a gaseous layer.

2. The radiation image storage panel according to claim 1, wherein the refractive index of said lower refractive index layer is substantially 1.

3. The radiation image storage panel according to claim 1, wherein a gas is at least one selected from air, nitrogen and argon.

4. The radiation image storage panel according to claim 2, wherein said lower refractive index layer is a vacuum layer.

5. IN a radiation image storage panel having a stimulable layer and a protective layer on a support, the improvement comprising a layer having a lower refractive index than the protective layer is provided between said stimulable phosphor layer and said protective layer, and wherein said lower refractive index layer is a liquid layer.

6. The radiation image storage panel according to claim 6, wherein a liquid is at least one selected from ethyl alcohol, methyl alcohol and diethyl ether.

7. In a radiation image storage panel having a stimulable layer and a protective layer on a support, the improvement comprising a layer having a lower refractive index than the protective layer is provided between said stimulable phosphor layer and said protective layer, and wherein said lower refractive index layer is at least one selected from $CaF_2$, $Na_3AlF_6$, $MgF_2$ and $SiO_2$.

8. In a radiation image storage panel having a stimulable layer and a protective layer on a support, the improvement comprising a layer having a lower refractive index than the protective layer is provided between said stimulable phosphor layer and said protective layer, and, wherein the refractive index of said protective layer is 1.4 to 2.0.

9. In a radiation image storage panel having a stimulable layer and a protective layer on a support, the improvement comprising a layer having a lower refractive index than the protective layer is provided between said stimulable phosphor layer and said protective layer, and, wherein the moisture permeability of said protective layer is 10 g/m$^2$·24 hr or less.

10. The radiation image storage panel according to claim 9, wherein said protective layer is at least one selected from quartz, borosilicate glass, chemically reinforced glass, polyethylene terephthalate, oriented polypropylene and polyvinyl chloride.

11. The radiation image storage panel according to claim 10, wherein said protective layer is at least one selected from quartz, borosilicate glass and chemically reinforced glass.

12. The radiation image storage panel according to claim 9, wherein the light transmittance of said protective layer is 80% or more.

13. In a radiation image storage panel having a stimulable layer and a protective layer on a support, the improvement comprising a layer having a lower refractive index than the protective layer is provided between said stimulable phosphor layer and said protective layer, and wherein a haze ratio determined by JIS K6714 of said protective layer is 3% of less.

14. The radiation image storage panel according to claim 13, wherein a haze ratio determined by JIS K6714 of said protective layer is 1% or less.

15. In a radiation image storage panel having a stimulable layer and a protective layer on a support, the improvement comprising a layer having a lower refractive index than the protective layer is provided between said stimulable phosphor layer and said protective layer, and wherein said protective layer comprises two or more layers having different moisture absorption properties.

16. The radiation image storage panel according to claim 15, wherein a protective layer having a smaller moisture absorption property is provided on the outside and a protective layer having a larger moisture absorption property is provided at the side of the stimulable phosphor layer.

17. The radiation image storage panel according to claim 16, wherein said protective layer having a smaller moisture absorption property comprises at least one selected from a plate glass, polyethylene and polytetrafluoroethylene.

18. The radiation image storage panel according to claim 16, wherein said protective layer having a larger moisture absorption property comprises polyvinyl alcohol or ethylene-vinyl alcohol copolymer.

19. In a radiation image storage panel having a stimulable layer and a protective layer on a support, the improvement comprising a layer having a lower refractive index than the protective layer is provided between said stimulable phosphor layer · and said protective layer, and wherein a layer having a higher refractive index layer than the layer having a lower refractive index layer is provided between the layer having a lower refractive index layer and the stimulable phosphor layer.

20. The radiation image storage panel according to claim 20, wherein said layer having a higher refractive index layer comprises at least one selected from $Al_2O_3$, $Sb_2O_3$, $CeO_2$, $CeF_3$, $La_2O_3$, $LaF_3$, $PbF_3$, $NdF_3$, $Pr_6O_{11}$, $SiO$, $SiO_2$, $TiO_2$, $ThO_2$, $ThF_4$, $ZnS$ and $ZrO_2$.

21. The radiation image storage panel according to claim 19, wherein said layer having a higher refractive index layer comprises a material having a high moisture absorption property.

22. The radiation image storage panel according to claim 21, wherein the equilibrium moisture absorption rate of said layer having a higher refractive index layer at a temperature of 25° C. and a relative humidity of 65% is 1 % or more.

23. In a radiation image storage panel having a stimulable layer and a protective layer on a support, the improvement comprising a layer having a lower refractive index than the protective layer is provided between said stimulable phosphor layer and said protective layer, and wherein said layer having a lower refractive index is provided between the protective layer and the stimulable phosphor layer by spraying a spacer material.

24. In a radiation image storage panel having a stimulable layer and a protective layer on a support, the improvement comprising a layer having a lower refractive index than the protective layer is provided between said stimulable phosphor layer and said protective layer, and wherein said layer having a lower refractive index layer is formed at edge portions of the panel by providing a protective layer supporting member having a thickness thicker than that of the stimulable phosphor layer.

25. The radiation image storage panel according to claim 24, wherein the moisture permeability of said protective layer supporting member is 10 g/m$^2$·24 hr or less.

26. The radiation image storage panel according to claim 25, wherein said protective layer supporting member comprises at least one selected from glass, ceramic, metal and plastic.

27. The radiation image storage panel according to claim 24, wherein said protective layer supporting member is adhered to the support and the protective layer with an adhesive agent.

28. The radiation image storage panel according to claim 27, wherein said adhesive agent is at least one selected from an epoxy resin, a phenol resin, a cyanoacrylate resin, a vinyl acetate resin, a vinyl chloride resin, a polyurethane resin, an acrylic resin, an ethylene-vinyl acetate resin, a poyolefin resin, a chloroprene rubber, a nitrile rubber and a silicone resin.

29. The radiation image storage panel according to claim 24, wherein the moisture absorption property of said protective layer supporting member is higher than that of the stimulable phosphor layer.

30. The radiation image storage panel according to claim 29, wherein said protective layer supporting member comprises at least one selected from polyvinyl alcohol, ethylene-vinyl alcohol copolymer, polyacrylamide, polyglycine, polymethacrylic acid, polyacrylic acid, polyvinyl pyrrolidone, polyvinyl amine, cellulose diacetate, cellulose triacetate, polyamide, polyvinyl acetate, polymethylallyl alcohol, and a moisture absorbable sheet containing silica gel or calcium carbonate.

31. The radiation image storage panel according to claim 29, wherein the outside of said protective layer supporting member is sealed with a low melting point glass.

32. The radiation image storage panel according to claim 24, wherein said protective layer supporting member comprises a first moistureproof member and a second moistureproof member having moistureproof means.

33. The radiation image storage panel according to claim 32, wherein said first moistureproof member is provided at the edge portion of the stimulable phosphor layer and adhered to the support and the protective layer.

34. The radiation image storage panel according to claim 32, wherein the moisture permeability of said first moistureproof member is 10 $g/m^2 \cdot 24$ hr or less.

35. The radiation image storage panel according to claim 32, wherein the moisture permeability of said second moistureproof member is 20 $g/m^2 \cdot 24$ hr or less.

36. The radiation image storage panel according to claim 34, wherein said first moistureproof member comprises at least one selected from chemically reinforced glass; crystallized glass; alumina, zirconia, aluminuim, iron, copper, chromium; a metal coated with an oxide of aluminum, iron, copper or chromium; cellulose acetate, polyester, polyethylene terephthalate, polyamide, polyimide, triacetate and polycarbonate.

37. The radiation image storage panel according to claim 35, wherein said second moistureproof member comprises at least one selected from a resin which cures by mixing two liquids of a two pack-type urethane adhesive agent, a two pack-type modified acrylate adhesive agent, a two pack-type modified acrylic adhesive agent, a two pack-type epoxy adhesive agent to effect polycondensation reaction or cross-linking reaction; and a radiation cure type resin which cures an energy of an electromagnetic wave or a corpuscular beam by irradiation of an electromagnetic wave or a corpuscular beam of X-ray, $\alpha$-ray, $\beta$-ray, $\gamma$-ray, high energy neutron beam, electron beam or ultraviolet ray.

38. The radiation image storage panel according to claim 32, wherein the elasticity of said first moistureproof member is lower than that of the second moistureproof member.

39. The radiation image storage panel according to claim 38, wherein said first moistureproof member comprises at least one selected from cellulose acetate, polyester, polyethylene terephthalate, polyamide, polyimide, triacetate, polycarbonate, polyethylene, epoxy resin, butadiene styrene rubber, butadiene-acrylonitrile rubber, isoprene rubber, chlorosulfonated polyethylene rubber, isobutylene rubber, isobutylene-isoprene rubber, acrylic rubber, polysulfide synthetic rubber, urethane rubber, natural rubber, propylene rubber, styrene rubber, butadiene rubber, silicone rubber and fluorine rubber 40. The radiation image storage panel according to claim 32, wherein a combination of said first moistureproof member and said second moistureproof member is one selected from urethane rubber-polyethylene, polyethylene epoxy resin, polyamide-unsaturated polyester or silicone rubberepoxy resin.

41. The radiation image storage panel according to claim 24, wherein edge portions of said protective layer supporting member is sealed with a sealing agent comprising an elastomer having a humidity resistance and a low elasticity.

42. The radiation image storage panel according to claim 41, wherein the moisture permeability of said elastomer is 20 $g/m^2 \cdot 24$ hr at the conditions of sealing the storage panel.

43. The radiation image storage panel according to claim 41, wherein the elasticity of said elastomer is 100 $kg/mm^2$ or less.

44. The radiation image storage panel according to claim 41, wherein said elastomer comprises at least one selected from low-density polyethylene, soft epoxy resin, natural rubber, propylene rubber, styrene rubber, butadiene rubber, silicone rubber, fluorine rubber, butadiene styrene rubber, butadiene-acrylonitrile rubber, isoprene rubber, chlorosulfonated polyethylene rubber, isobutylene rubber, isobutylene-isoprene rubber, acrylic rubber, polysulfide synthetic rubber and urethane rubber.

45. The radiation image storage panel according to claim 24, wherein said layer having a lower refractive index is a gaseous layer.

46. The radiation image storage panel according to claim 45, wherein a gas of said gaseous layer is a dried gas selected from He, Ne, Ar, $0_2$, $H_2$ and $CO_2$.

47. The radiation image storage panel according to claim 46, wherein the water content of said dried is 5.0 mg/liter or less.

48. The radiation image storage panel according to claim 24, wherein a hygroscopic agent is provided between the support and the protective layer.

49. The radiation image storage panel according to claim 48, wherein the water absorption amount of said hygroscopic agent is 0.1 to 50 mg per 1 g of the stimulable phosphor.

50. The radiation image storage panel according to claim 48, wherein said hygroscopic agent is at least one selected from silica gel, $CaCl_2$, LiCl, polyvinyl alcohol and ethylene-vinyl alcohol copolymer.

51. In a radiation image storage panel having a stimulable layer and a protective layer on a support, the improvement comprising a layer having a lower refractive index than the protective layer is provided between said stimulable phosphor layer and said protective layer, and, wherein the permeability of said support is 10 $g/m^2 \cdot 24$ hr or less.

52. The radiation image storage panel according to claim 51, wherein said support comprises at least one selected from chemically reinforced glass, crystallized glass; aluminum, zirconia, aluminum, iron, copper, chromium; a metal coated thereon with an oxide of aluminum, iron, copper or chromium; cellulose acetate, polyester, polyethylene terephthalate, polyamide, polyimide, triacetate and polycarbonate.

53. A process for preparing a radiation image storage panel composed of a support, a stimulable phosphor layer and a protective layer, and a protective layer supporting member is provided between layers of said support and said protective layer so as to surround and seal edges of said stimulable phosphor layer, which comprises the steps of providing at least one notch to said protective layer supporting member which functions as a vent hole, heating and drying said radiation image storage panel, and then fusing and sealing said notch or notches.

54. The process for preparing a radiation image storage panel according to claim 53, wherein said heating and drying are carried out at 40 to 100° C. for 0.1 to 3 hours.

55. The process for preparing a radiation image storage panel according to claim 53, wherein said heating and drying are carried out under a reduced pressure.

56. The process for preparing a radiation image storage panel according to claim 53, wherein number of said notch is one or two.

57. The process for preparing a radiation image storage panel according to claim 53, wherein the width of said notch is 2 to 40 mm.

58. The process for preparing a radiation image storage panel according to claim 53, wherein air at the inside of the storage panel is replaced with a dried gas after said heating and drying.

59. The process for preparing a radiation image storage panel according to claim 58, wherein the water content of said dried is 5.0 mg/liter or less.

60. The process for preparing a radiation image storage panel according to claim 58, wherein said gas is at least one selected from He, Ne, Ar, $0_2$, $H_2$ and $CO_2$.

61. The process for preparing a radiation image storage panel according to claim 53, wherein the moisture permeability of said protective layer is 10 /g/$m^2$·24 hr or less.

62. The process for preparing a radiation image storage panel according to claim 61, wherein said protective layer is at least one selected from quartz, borosilicate glass, chemically reinforced glass, polyethylene terephthalate, oriented polypropylene and polyvinyl chloride.

63. The process for preparing a radiation image storage panel according to claim 62, wherein said protective layer is at least one selected from quartz, borosilicate glass and chemically reinforced glass.

64. The process for preparing a radiation image storage panel according to claim 61, wherein the light transmittance of said protective layer is 80% or more.

65. The process for preparing a radiation image storage panel according to claim 53, wherein the moisture permeability of said protective layer supporting member is 10 g/$m^2$·24 hr or less.

66. The process for preparing a radiation image storage panel according to claim 53, wherein said protective layer supporting member comprises at least one selected from glass, ceramic, metal and plastic.

67. The process for preparing a radiation image storage panel according to claim 53, wherein said protective layer supporting member is adhered to the support and the protective layer with an adhesive agent.

68. The process for preparing a radiation image storage panel according to claim 67, wherein said adhesive agent is at least one selected from an epoxy resin, a phenol resin, a cyanoacrylate resin, a vinyl acetate resin, a vinyl chloride resin, a polyurethane resin, an acrylic resin, an ethylene-vinyl acetate resin, a polyolefin resin, a chloroprene rubber, a nitrile rubber and a silicone resin.

69. The process for preparing a radiation image storage panel according to claim 59, wherein the permeability of said support is 10 g/$m^2$·24 hr or less.

70. The process for preparing a radiation image storage panel according to claim 69, wherein said support comprises at least one selected from chemically reinforced glass, crystallized glass; aluminum, zirconia, aluminum, iron, copper, chromium; a metal coated thereon with an oxide of aluminum, iron, copper or chromium; cellulose acetate, polyester, polyethylene terephthalate, polyamide, polyimide, triacetate and polycarbonate.

71. A radiation image storage panel composed of a support, a stimulable phosphor layer and a protective layer, and a protective layer supporting member is so provided between layers of said support and said protective layer as to surround and seal edges of said stimulable phosphor layer, characterized in that said panel is prepared by providing at least one notch to said protective layer supporting member which functions as a vent hole, heating and drying said radiation image storage panel, and then fusing and sealing said notch or notches.

* * * * *

UNITED STATES PATENT AND TRADEMARK OFFICE

CERTIFICATE OF CORRECTION

PATENT NO. : 5,023,461

DATED : June 11, 1991

INVENTOR(S) : NAKAZAWA et al

It is certified that error appears in the above-identified patent and that said Letters Patent is hereby corrected as shown below:

On the title page, item [56] References Cited, under the "U.S. PATENT DOCUMENTS", change "4,212,107" to --4,292,107--.

Above "Primary Examiner", insert

-- FOREIGN PATENT DOCUMENTS 3031267 3/1982 West Germany
0084818 8/1983 Europe --.

Signed and Sealed this

Twenty-eighth Day of September, 1993

Attest:

BRUCE LEHMAN

*Attesting Officer* *Commissioner of Patents and Trademarks*